United States Patent
Tsukagoshi

(10) Patent No.: US 10,856,042 B2
(45) Date of Patent: Dec. 1, 2020

(54) TRANSMISSION APPARATUS, TRANSMISSION METHOD, RECEPTION APPARATUS AND RECEPTION METHOD FOR TRANSMITTING A PLURALITY OF TYPES OF AUDIO DATA ITEMS

(71) Applicant: SONY CORPORATION, Tokyo (JP)

(72) Inventor: Ikuo Tsukagoshi, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/513,058

(22) PCT Filed: Sep. 16, 2015

(86) PCT No.: PCT/JP2015/076259
§ 371 (c)(1),
(2) Date: Mar. 21, 2017

(87) PCT Pub. No.: WO2016/052191
PCT Pub. Date: Apr. 7, 2016

(65) Prior Publication Data
US 2017/0302995 A1    Oct. 19, 2017

(30) Foreign Application Priority Data

Sep. 30, 2014   (JP) ................... 2014-202354

(51) Int. Cl.
*H04N 21/442* (2011.01)
*G10L 19/008* (2013.01)
(Continued)

(52) U.S. Cl.
CPC ....... *H04N 21/44209* (2013.01); *G10L 19/00* (2013.01); *G10L 19/008* (2013.01);
(Continued)

(58) Field of Classification Search
CPC .......... H04N 21/44209; H04N 21/6375; H04L 29/06027; H04L 65/608; H04L 65/80
(Continued)

(56) References Cited

U.S. PATENT DOCUMENTS

2003/0231870 A1* 12/2003 Nagahara ............. G11B 27/034
386/240
2004/0208135 A1* 10/2004 Nakamura ............. G11B 20/10
370/265
(Continued)

FOREIGN PATENT DOCUMENTS

| CN | 103650535 A | 3/2014 |
| CN | 103843330 A | 6/2014 |

(Continued)

OTHER PUBLICATIONS

International Search Report dated Dec. 15, 2015, in PCT/JP2015/076259. filed Sep. 16, 2015.
(Continued)

*Primary Examiner* — Nicholas R Taylor
*Assistant Examiner* — Chong G Kim
(74) *Attorney, Agent, or Firm* — Oblon, McClelland, Maier & Neustadt, L.L.P.

(57) ABSTRACT

To reduce a processing load at a reception side in a case where a plurality kinds of audio data items are transmitted. A container in a predetermined format having a predetermined number of audio streams including coded data items of a plurality of groups is transmitted. For example, the coded data items of the plurality of groups include either or both of channel coded data items and object coded data items. Attribute information indicating respective attributes of the coded data items of the plurality of groups is inserted into a layer of the container and/or a layer of an audio stream. For example, stream correspondence relation infor-
(Continued)

mation indicating which audio stream includes each of the coded data items of the plurality of groups is further inserted.

17 Claims, 24 Drawing Sheets

(51) Int. Cl.
*G10L 19/00* (2013.01)
*H04L 29/06* (2006.01)
*H04N 21/6375* (2011.01)

(52) U.S. Cl.
CPC ...... *H04L 29/06027* (2013.01); *H04L 65/608* (2013.01); *H04L 65/80* (2013.01); *H04N 21/6375* (2013.01)

(58) Field of Classification Search
USPC .......................................................... 709/231
See application file for complete search history.

(56) References Cited

U.S. PATENT DOCUMENTS

| | | | |
|---|---|---|---|
| 2006/0080094 A1 | 4/2006 | Katayama et al. | |
| 2006/0256701 A1 | 11/2006 | Takakuwa et al. | |
| 2009/0028189 A1* | 1/2009 | Kato | G10L 19/24 370/476 |
| 2009/0123131 A1* | 5/2009 | Morioka | H04L 9/0844 386/241 |
| 2010/0088103 A1 | 4/2010 | Katayama et al. | |
| 2010/0278514 A1* | 11/2010 | Mae | G11B 27/034 386/248 |
| 2012/0030253 A1* | 2/2012 | Katsumata | G11B 27/3027 707/804 |
| 2012/0307842 A1* | 12/2012 | Petrov | H04N 21/23608 370/474 |
| 2013/0152121 A1* | 6/2013 | Bartel-Kurz | H04H 60/15 725/31 |
| 2013/0222690 A1* | 8/2013 | Kim | H04S 3/00 348/462 |
| 2013/0247124 A1* | 9/2013 | Kitazato | H04N 21/2625 725/115 |
| 2013/0287364 A1 | 10/2013 | Katsumata | |
| 2013/0291046 A1* | 10/2013 | Ko | H04N 21/84 725/116 |
| 2014/0201795 A1* | 7/2014 | Huber | H04L 65/4076 725/110 |
| 2014/0380135 A1* | 12/2014 | Hong | H04H 20/42 714/776 |
| 2016/0198311 A1* | 7/2016 | Kwon | H04L 1/0041 370/312 |
| 2017/0034588 A1* | 2/2017 | Oh | H04N 21/26258 |
| 2017/0249944 A1* | 8/2017 | Tsukagoshi | G10L 19/008 |
| 2017/0289720 A1* | 10/2017 | Tsukagoshi | G10L 19/008 |

FOREIGN PATENT DOCUMENTS

| | | |
|---|---|---|
| CN | 106798793 A | 5/2017 |
| EP | 2 416 321 A1 | 2/2012 |
| EP | 3 196 876 A1 | 7/2017 |
| JP | 2012-33243 A | 2/2012 |
| JP | 2014-142475 A | 8/2014 |
| JP | 2014-520491 A | 8/2014 |
| WO | 2004/066303 A1 | 8/2004 |
| WO | 2004/077406 A1 | 9/2004 |
| WO | WO 2013/006338 A2 | 1/2013 |
| WO | WO 2014/058275 A1 | 4/2014 |

OTHER PUBLICATIONS

Extended European Search Report dated May 30, 2018 in corresponding European Patent Application No. 15846012.1, 13 pages.
Stephan Schreiner et al: "On multiple MPEG-H 3D Audio streams", ISO/IEC JTC1/SC29/WG11, MPEG2014/M34266, XP30062639, Jul. 2014, 6 pages.
Office Action dated Aug. 21, 2019 in European Patent Application No. 15 846 012.1-1210. (7 pgs.).
Office Action dated Nov. 5, 2019 in Japanese Patent Application No. 2016-551907, 5 pages.
Office Action dated Feb. 6, 2020 in China Patent Application No. 2015800514309 (with English translation), 24 pgs.
Office Action dated Apr. 2, 2020 in Europe Patent Application No. 15 846 012.1—1210, 6 pgs.
"High Efficiency Coding and Media Delivery in Heterogeneous Environments—Part 3: 3D Audio"; ISO/IEC DIS 23008-3 Information Technology: ISO/IEC/JTC 1/SC 29; 109$^{th}$ MPEG Meeting; Sappore (JP), Jul. 7-11, 2014; Jul. 25, 2014; XP055205625; Retrieved from the Internet; URL://http://mpeg.chiariglione.org/standards/mpeg-h/3d-audio/dis-mpeg-h-3d-audio; [retrieved on Jul. 30, 2015], 433 pages.
Office Action dated May 26, 2020 in Japan Patent Application No. 2016-551907 (with English-language translation); 10 pgs.

* cited by examiner

| groupID | attribute | switchGroupID | presetGroupID [1] | presetGroupID [2] | StreamID | Kind |
|---|---|---|---|---|---|---|
| 1 | Channel data | 0 | 1 | 1 | 1 | |
| 2 | Object sound | 0 | 2 | 2 | 1 | |
| 3 | Object language1 | 1 | 3 | | 2 | |
| 4 | Object language2 | 1 | | 4 | 2 | |

FIG.6

| groupID | attribute | switchGroupID | presetGroupID [1] | presetGroupID [2] | StreamID | Kind |
|---|---|---|---|---|---|---|
| 1 | Channel data | 0 | 1 | 1 | 1 | |
| 2 | Object sound | 0 | 2 | 2 | 1 | |
| 3 | Object language1 | 1 | 3 | | 2 | |
| 4 | Object language2 | 1 | | 4 | 2 | |
| 5 | SAOC object data | 2 | | | 1 | |
| 6 | HOA data | 2 | | | 1 | |
| 7 | Audio description1 | 3 | 7 | | 2 | |
| 8 | Audio description2 | 3 | | 8 | 2 | |

FIG.8

3Daudio_stream_config_descriptor

| Syntax | No. of Bits | Format |
|---|---|---|
| 3Daudio_stream_config_descriptor(){ | | |
| descriptor_tag | 8 | uimsbf |
| descriptor_length | 8 | uimsbf |
| NumOfGroups, N | 8 | uimsbf |
| NumOfPresetGroups, P | 8 | uimsbf |
| for (i = 0 ; i < N ; i++){ | | |
| groupID | 8 | uimsbf |
| attribute_of_groupID | 8 | uimsbf |
| SwitchGroupID | 8 | uimsbf |
| contentKind | 8 | uimsbf |
| audio_streamID | 8 | uimsbf |
| } | | |
| for (j = 0 ; j < P ; j++){ | | |
| presetGroupID | 8 | uimsbf |
| NumOfGroups_in_preset, R | 8 | uimsbf |
| for (k = 0 ; k < R ; k++){ | | |
| groupID | 8 | uimsbf |
| } | | |
| } | | |
| } | | |

FIG.10

Semantics of 3Daudio_stream_config_descriptor

NumOfGroups (8bits)
    Shows number of Group (value of 1 or more)
NumOfPresetGroups (8bits)
    Shows number of PresentGroup (value of 1 or more)
groupID (8bits)
    Shows identifier of group (value other than 0)
attribute_of_groupID (8bits)
    Shows attribute of coded data item of the group (value other than 0)
switchGroupID (8bits)
    Identifier indicating switchGroup to which the group belongs
    '0' Does not belong any switchGroup
    Other than '0' Indicate switchGroup to which it belongs
contentKind (8bits)
    Indicate kind of content of group
audio_streamID (8bits)
    Identifier of audio stream
presetGroupID (8bits)
    Identifier indicating bundle where Group is preset
NumOfGroups_in_preset (8bits)
    Indicate number of Group belonging to presetGroup

FIG.11

| ContentKind | description |
| --- | --- |
| 0 | undefined |
| 1 | complete main |
| 2 | dialogue |
| 3 | music |
| 4 | effect |
| 5 | mixed |
| 6 | LFE |
| 7 | voiceover |
| 8 | spokensubtitle |
| 9 | audiodescription/visually impaired |
| 10 | commentary |
| 11 | hearing impaired |
| 12 | emergency |
| 13-15 | reserved |

FIG.12

3Daudio_streamID_descriptor

| Syntax | No. of Bits | Format |
|---|---|---|
| 3Daudio_streamID_descriptor(){ | | |
| descriptor_tag | 8 | uimsbf |
| descriptor_length | 8 | uimsbf |
| audio_streamID | 8 | uimsbf |
| } | | |

(a)

audio_streamID (8bits)
Identifier of audio sub stream (b)

FIG.13

TRANSMISSION APPARATUS, TRANSMISSION METHOD, RECEPTION APPARATUS AND RECEPTION METHOD FOR TRANSMITTING A PLURALITY OF TYPES OF AUDIO DATA ITEMS

TECHNICAL FIELD

The present technology relates to a transmission apparatus, a transmission method, a reception apparatus and a reception method, and more particularly to a transmission apparatus or the like that transmits a plurality kinds of audio data items.

BACKGROUND ART

In the related art, as a three-dimensional (3D) acoustic technology, there has been proposed a technology that a coded sample data item is mapped and rendered to a speaker present at any position on the basis of a metadata item (for example, see Patent Literature 1).

CITATION LIST

Patent Literature

Patent Literature 1: Translation of PCT International Application Publication No. 2014-520491

DISCLOSURE OF INVENTION

Technical Problem

It is conceivable that a sound having an enhanced realistic feeling can be regenerated at a reception side by sending an object coded data item including a coded sample data item and a metadata item together with a channel coded data item of 5.1 channels, 7.1 channels, or the like.

It is an object of the present technology to reduce a processing load at the reception side in a case where a plurality kinds of audio data items are transmitted.

Solution to Problem

A concept of the present technology is a transmission apparatus including a transmission unit that transmits a container in a predetermined format having a predetermined number of audio streams including coded data items of a plurality of groups, and an information insertion unit that inserts attribute information indicating respective attributes of the coded data items of the plurality of groups into a layer of the container and/or a layer of an audio stream.

In the present technology, the transmission unit transmits the container in the predetermined format having the predetermined number of audio streams including the coded data items of the plurality of groups. For example, the coded data items of the plurality of groups may include either or both of channel coded data items and object coded data items.

By the information insertion unit, the attribute information indicating respective attributes of the coded data items of the plurality of groups is inserted into the layer of the container and/or the layer of the audio stream. For example, the container may be a transport stream (MPEG-2 TS) that is adopted in a digital broadcasting standard. Also, for example, the container may be in a format of MP4 used for Internet delivery or others.

Thus, in the present technology, the attribute information indicating respective attributes of the coded data items of the plurality of groups included in the predetermined number of audio streams is inserted into the layer of the container and/or the layer of the audio stream. Accordingly, the respective attributes of the coded data items of the plurality of groups can be easily recognized before decoding the coded data items at the reception side, and only the coded data items of a necessary group can be selectively decoded and used, whereby a processing load can be reduced.

In addition, in the present technology, for example, the information insertion unit may further insert stream correspondence relation information indicating which audio stream includes each of the coded data items of the plurality of groups into the layer of the container and/or the layer of the audio stream. In this manner, the audio streams including the coded data items of the necessary group can be easily recognized at the reception side, whereby a processing load can be reduced.

In this case, for example, the container may be MPEG2-TS, and the information insertion unit may insert the attribute information and stream identifier information into an audio elementary stream, loop corresponding to at least one or more of the audio streams among the predetermined number of audio streams present under a program map table in a case where the attribute information and the stream identifier information are inserted into the container.

Also, in this case, for example, the information insertion unit may insert the attribute information and the stream correspondence relation information into a PES payload of a PES packet of at least one or more of the audio streams among the predetermined number of audio streams in a case where the attribute information and the stream correspondence relation information are inserted into the audio stream.

For example, the stream correspondence relation information may be information indicating a correspondence relation between a group identifier for identifying each of the coded data items of the plurality of groups and a stream identifier for identifying each of the predetermined number of audio streams. In this case, for example, information insertion unit may insert stream identifier information indicating the stream identifier of each of the predetermined number of audio streams into the layer of the container and/or the layer of the audio stream.

For example, the container may be MPEG2-TS, and the information insertion unit may insert the stream identifier information into an audio elementary stream loop corresponding to each of the predetermined number of audio streams present under a program map table in a case where the stream identifier information is inserted into the container. Also, for example, the information insertion unit may insert the stream identifier information into a PES payload of a PES packet of each of the predetermined number of audio streams in a case where the stream identifier information is inserted into the audio stream.

Also, for example, the stream correspondence relation information may be information indicating a correspondence relation between the group identifier for identifying each of the coded data items of the plurality of groups and a packet identifier added when each of the predetermined number of audio streams is packetized. Also, for example, the stream correspondence relation information may be information indicating a correspondence relation between the group identifier for identifying each of the coded data items of the plurality of groups and type information indicating a stream type of each of the predetermined number of audio streams.

In addition, other concept of the present technology is a reception apparatus including a receiving unit that receives a container in a predetermined format having a predetermined number of audio streams including coded data items of a plurality of groups, attribute information indicating respective attributes of the coded data items of the plurality of groups being inserted into a layer of the container and/or a layer of an audio stream, and a processing unit that processes the predetermined number of audio streams included in the received container on the basis of the attribute information.

In the present technology, the receiving unit receives the container in the predetermined format having the predetermined number of audio streams including coded data items of the plurality of groups. For example, the coded data items of the plurality of groups may include either or both of the channel coded data items and the object coded data items. The attribute information indicating respective attributes of the coded data items of the plurality of groups is inserted into the layer of the container and/or the layer of an audio stream. The processing unit processes the predetermined number of audio streams included in the received container on the basis of the attribute information.

Thus, in the present technology, the predetermined number of audio streams included in the received container are processed on the basis of the attribute information indicating respective attributes of the coded data items of the plurality of groups inserted into the layer of the container and/or the layer of the audio stream. Accordingly, only the coded data items of the necessary group can be selectively decoded and used, whereby a processing load can be reduced.

In addition, in the present technology, for example, the stream correspondence relation information indicating which audio stream includes each of the coded data items of the plurality of groups is further inserted into the layer of the container and/or the layer of the audio stream. The processing unit may process the predetermined number of audio streams on the basis of the stream correspondence relation information in addition to the attribute information. In this case, the audio streams including the coded data items of the necessary group can be easily recognized, whereby a processing load can be reduced.

Also, in the present technology, for example, the processing unit may perform selectively decode processing on audio streams including coded data items of a group having attributes adapted for a speaker configuration and a user selection information on the basis of the attribute information and the stream correspondence relation information.

In addition, other concept of the present technology is a reception apparatus including a receiving unit that receives a container in a predetermined format having a predetermined number of audio streams including coded data items of a plurality of groups, attribute information indicating respective attributes of the coded data items of the plurality of groups being inserted into a layer of the container and/or a layer of an audio stream, a processing unit that selectively acquires coded data items of a predetermined group from the predetermined number of audio streams included in the received container on the basis of the attribute information, and reconfigures audio streams including the coded data items of the predetermined group, and a stream transmission unit that transmits the audio streams reconfigured by the processing unit to an external device.

In the present technology, the receiving unit receives the container in the predetermined format having the predetermined number of audio streams including the coded data items of the plurality of groups. The attribute information indicating respective attributes of the coded data items of the plurality of groups is inserted into the layer of the container and/or the layer of the audio stream. The processing unit selectively acquires the coded data items of the predetermined group from the predetermined number of audio streams included in the received container on the basis of the attribute information, and reconfigures audio streams including the coded data items of the predetermined group. The stream transmission unit transmits the audio streams reconfigured by the processing unit to the external device.

Thus, in the present technology, the coded data items of the predetermined group are selectively acquired from the predetermined number of audio streams on the basis of the attribute information indicating the respective attributes of the coded data items of the plurality of groups inserted into the layer of the container and/or the layer of an audio stream, and the audio streams to be transmitted to the external device are reconfigured. The coded data items of the necessary group can be easily acquired, whereby a processing load can be reduced.

Also, in the present technology, for example, the stream correspondence relation information indicating which audio stream includes each of the coded data items of the plurality of groups is further inserted into the layer of the container and/or the layer of the audio stream. The processing unit may selectively acquire the coded data items of the predetermined group from the predetermined number of audio streams on the basis of the stream correspondence relation information in addition to the attribute information. In this case, the audio streams including the coded data items of the predetermined group can be easily recognized, whereby a processing load can be reduced.

Advantageous Effects of Invention

According to the present technology, in a case where a plurality kinds of audio data items are transmitted, a processing load at a reception side can be reduced. It should be noted that the effects described in the present specification are merely illustrative and are not limitative, and may have additive effects.

BRIEF DESCRIPTION OF DRAWINGS

FIG. 6 is a diagram showing a correspondence relation or the like between a group and a stream in the group division example (two divisions).

FIG. 8 is a diagram showing a correspondence relation or the like between a group and a stream in the group division example (two divisions).

FIG. 10 is a diagram showing a configuration example of a 3D audio stream config descriptor.

FIG. 11 shows contents of principal information in the configuration example of the 3D audio stream config descriptor.

FIG. 12 is a diagram showing kinds of contents defined in "contentKind".

FIG. 13 is a diagram showing a configuration example of a 3D audio stream ID descriptor and contents of principal information in the configuration example.

MODE(S) FOR CARRYING OUT THE INVENTION

Hereinafter, an embodiment of the present disclosure will be described with reference to the drawings. The description will be made in the following order.

1. Embodiment

2. Alternative Embodiment

1. Embodiments

Configuration Example of Transmission/Reception System

Figure 1:
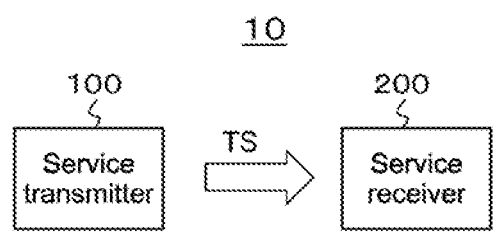
FIG. 1 is a block diagram showing a configuration example of a transmission/reception system as an embodiment.

FIG. 1 shows a configuration example of a transmission/reception system 10 as an embodiment. The transmission/reception system 10 includes a service transmitter 100 and a service receiver 200. The service transmitter 100 transmits a transport stream TS on a broadcast wave or a net packet. The transport stream TS has a video stream and a predetermined number of, i.e., one or more audio streams including coded data items of a plurality of groups.

Figure 2:
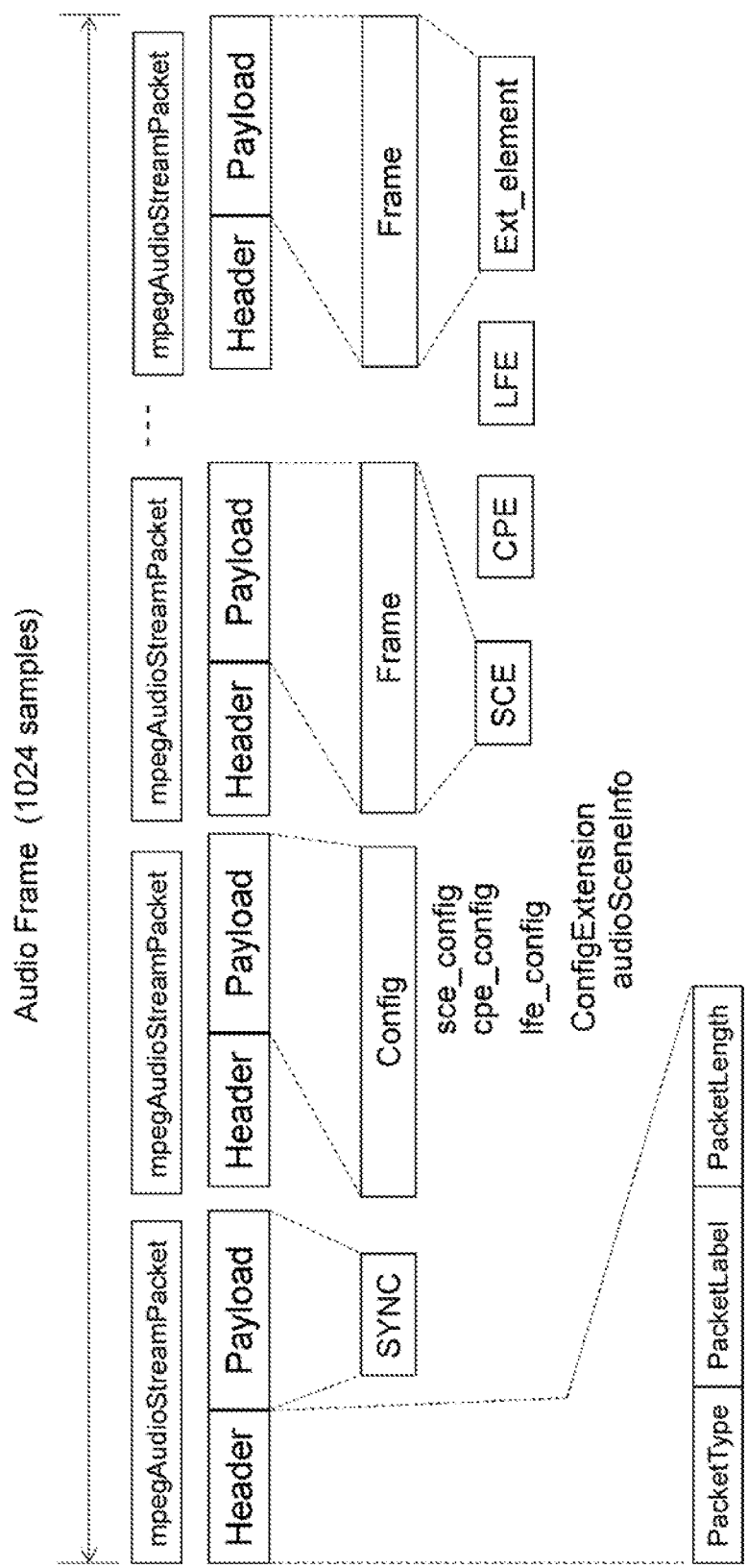
FIG. 2 is a diagram showing a structure of an audio frame (1024 samples) in a 3D audio transmission data items.

FIG. 2 shows a structure of an audio frame (1024 samples) in a 3D audio transmission data items handled in this embodiment. The audio frame includes a plurality of MPEG audio stream packets (mpeg Audio Stream Packet). Each MPEG audio stream packet includes a header (Header) and a payload (Payload).

The header has information about a packet, type (Packet Type), a packet label (Packet Label), a packet length (Packet Length), or the like. The information defined by the packet type in the header is disposed on the payload. At the payload information, "SYNC" corresponding to a synchronization start code, "Frame" that is actual data of the 3D audio transmission data items, and "Config" indicating the configuration of the "Frame" are present.

The "Frame" includes the channel coded data item and the object coded data item configuring the 3D audio transmission data items. Here, the channel coded data item includes coded sample data items such as an SCE (Single Channel Element), a CPE (Channel Pair Element), an LFE (Low Frequency Element) and the like. In addition, the object coded data item includes the coded sample data item of the SCE (Single Channel Element), and a metadata item for mapping and rendering it to a speaker present at any position. The metadata item is included as an extension element (Ext_element).

Figure 3:
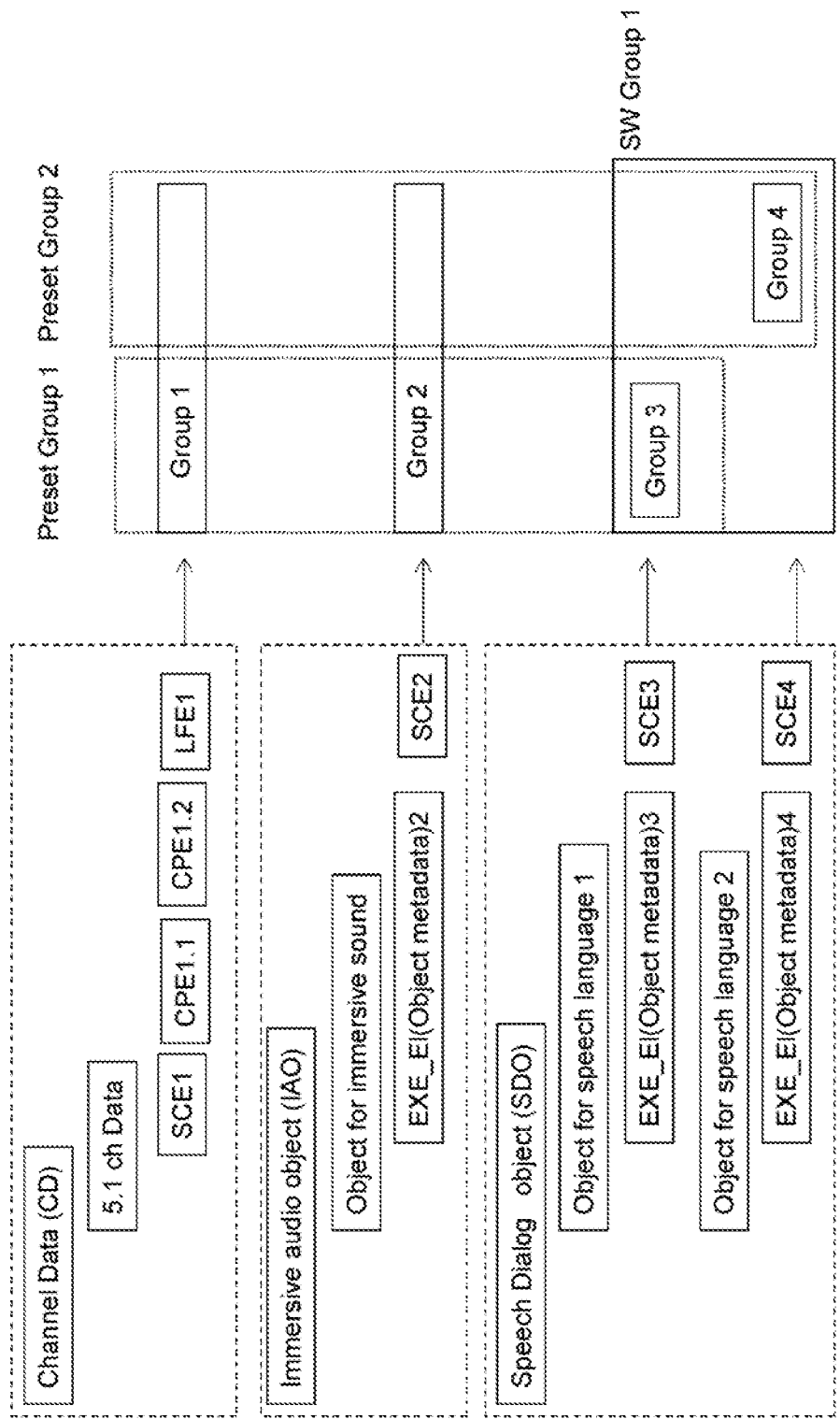
FIG. 3 is a diagram showing a configuration example of the 3D audio transmission data items.

FIG. 3 shows a configuration example of the 3D audio transmission data items. In this example, it includes one channel coded data item and two object coded data items. The one channel coded data item is a channel coded data item (CD) of the 5.1 channel, and includes each coded sample data item of SCE1, CPE1.1, CPE1.2, and LFE1.

The two object coded data items are coded data items of an Immersive Audio Object (IAO) and a Speech Dialog Object (SDO). The immersive audio object coded data item is the object coded data item for immersive sound, and includes a coded sample data item SCE2 and a metadata item EXE_E1 (Object metadata) 2 for mapping and rendering it to a speaker present at any position.

The speech dialog object coded data item is the object coded data item for speech language. In this example, the speech dialog object coded data item corresponding to each of first and second languages is present. The speech dialog object coded data item corresponding to the first language includes a coded sample data item SCE3, and a metadata item EXE_E1 (Object metadata) 3 for mapping and rendering it to a speaker present at any position. Also, the speech dialog object coded data item corresponding to the second language includes a coded sample data item SCE4, a metadata item EXE_E1 (Object metadata) 4 for mapping and rendering it to a speaker present at any position.

The coded data items are classified by a concept of a group (Group) on a type basis. In the example shown, the coded channel data item of the 5.1 channel is classified as Group 1, the immersive audio object coded data item is classified as Group 2, the speech dialog object coded data item according to the first language is classified as Group 3, and the speech dialog object coded data item according to the second language is classified as Group 4.

Also, that selected between the groups at the reception side is registered as a switch (SW Group) group and is encoded. In addition, the groups are bundled as a preset group (preset Group), whereby regeneration corresponding to a use case is possible. In the example shown, Group 1, Group 2 and Group 3 are bundled as a preset Group 1, and Group 1, Group 2 and Group 4 are bundled as a preset Group 2.

Returning to FIG. 1, the service transmitter 100 transmits the 3D audio transmission data items including the coded data items of the plurality of groups by one stream or multiple streams (Multiple stream), as described above.

Figure 4:
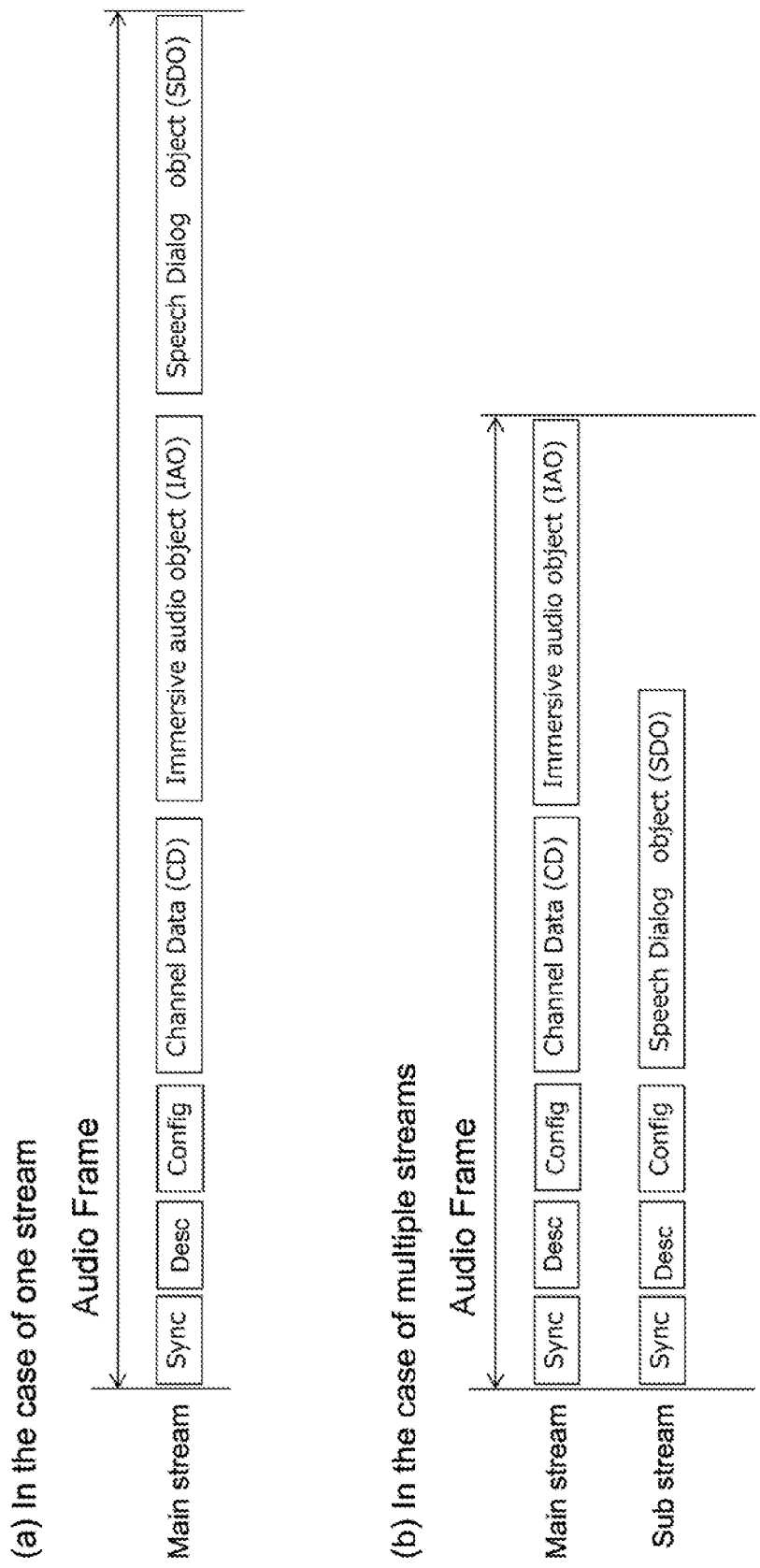
FIG. 4 is a diagram schematically showing a configuration example of the audio frame in a case where the 3D audio transmission data items are transmitted by one stream and multiple streams.

FIG. 4(a) schematically shows a configuration example in a case where the 3D audio transmission, data items in FIG. 3 are transmitted by one stream (main stream). In this case, the one stream includes the channel coded data item (CD), the immersive audio object coded data item (IAO), and the speech dialog object coded data item (SDO) together with the "SYNC" and the "Config".

FIG. 4(b) schematically shows a configuration example in a case where the 3D audio transmission data items in FIG. 3 are transmitted by the multiple streams, here, two streams. In this case, the main stream includes the channel coded data item (CD) and the immersive audio object coded data item (IAO) together with the "SYNC" and the "Config". Also, the sub stream includes the speech dialog object coded data item (SDO) together with the "SYNC" and the "Config".

Figure 5:
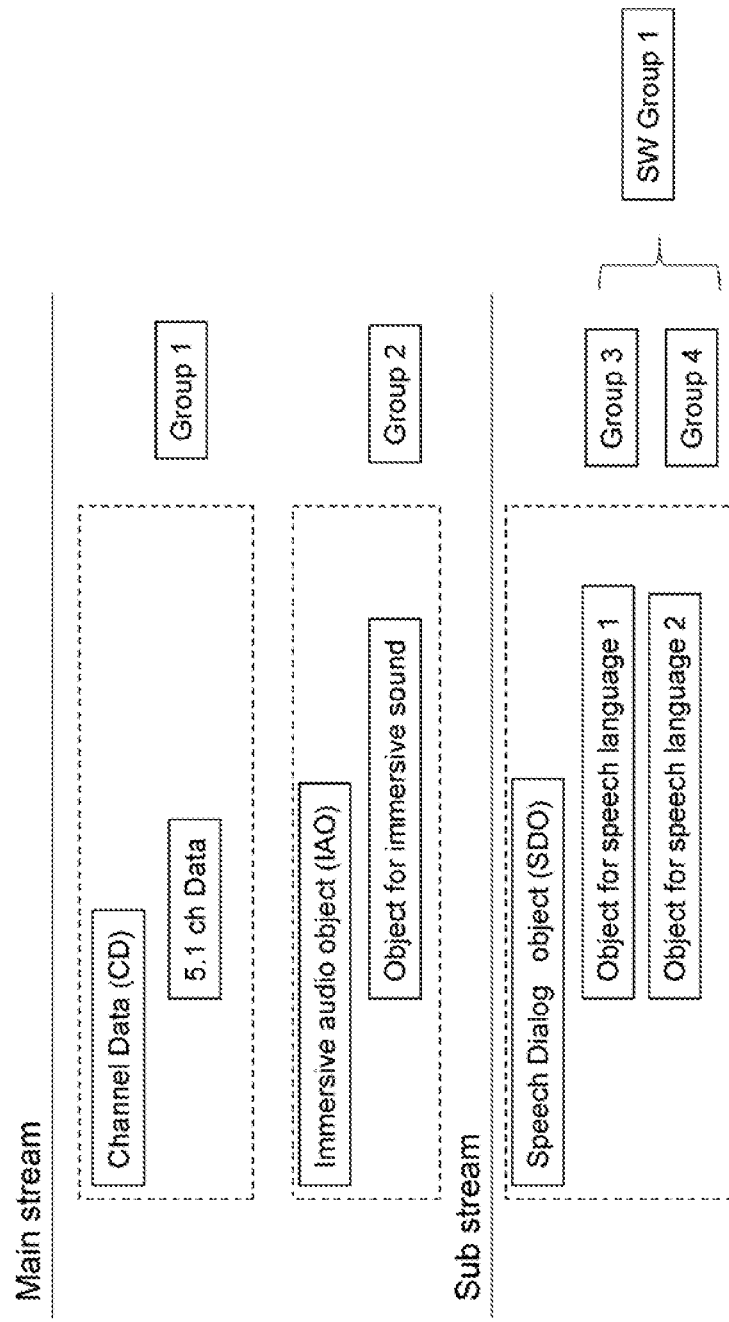
FIG. 5 is a diagram showing a group division example in a case where the 3D audio transmission data items are transmitted by two streams.

FIG. 5 shows a group division example in a case where the 3D audio transmission data items in FIG. 3 are transmitted by two streams. In this case, the main stream includes the channel coded data item (CD) classified as Group 1, and the immersive audio object coded data item (IAO) classified as Group 2. Also, the sub stream includes the speech dialog object coded data item (SDO) according to the first language classified as Group 3, and the speech dialog object coded data item (SDO) according to the second language classified as Group 4.

FIG. 6 shows a correspondence relation or the like between a group and a stream in the group division example (two divisions) in FIG. 5. Here, a group ID (group ID) is an identifier for identifying a group. An attribute (attribute) shows an attribute of an coded data item of each group. A switch group ID (switch Group ID) is an identifier for identifying a switching group. A preset group ID (preset Group ID) is an identifier for identifying a preset group. A stream ID (sub Stream ID) is an identifier for identifying a sub stream. A kind (Kind) shows kinds of contents of each group.

The correspondence relation illustrated shows that the coded data item belonging to Group 1 is the channel coded data item, does not constitute the switch group, and is included in the stream 1. Also, the correspondence relation illustrated shows that the coded data item belonging to Group 2 is the object coded data item for immersive sound (immersive audio object coded data item), does not constitute the switch group, and is included in the stream 1.

Also, the correspondence relation illustrated shows that the coded data item belonging to Group 3 is the object coded data item for speech language (speech dialog object coded data item) according to the first language, constitutes the switch Group 1, and is included in the stream 2. Also, the correspondence relation illustrated shows that the coded data item belonging to Group 4 is the object coded data item for speech language (speech dialog object coded data item) according to the second language, constitutes the switch Group 1, and is included in the stream 2.

Also, the correspondence relation illustrated shows that the preset Group 1 includes Group 1, Group 2 and Group 3. Furthermore, the correspondence relation illustrated shows that the preset Group 2 includes Group 1, Group 2 and Group 4.

Figure 7:
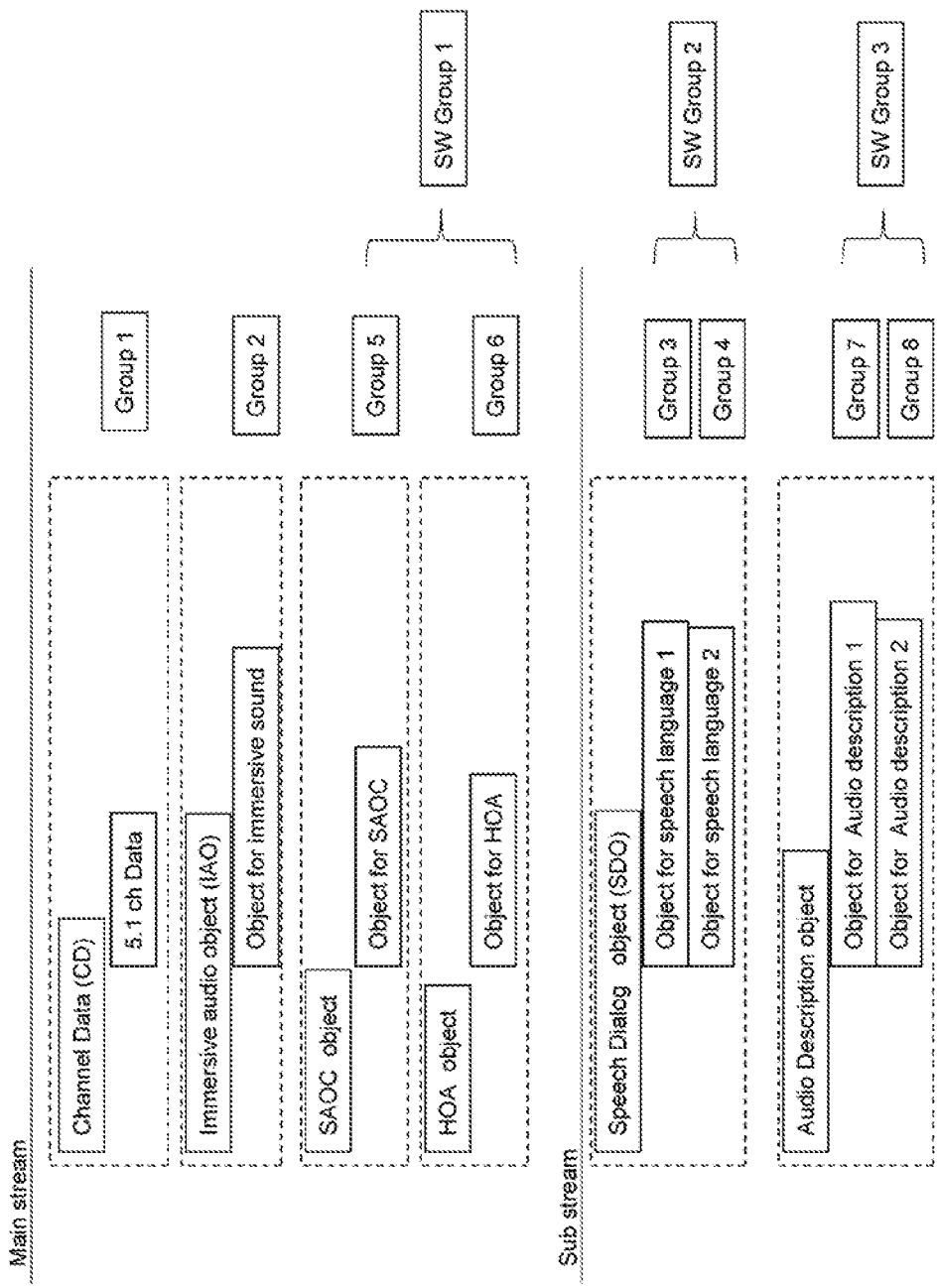
FIG. 7 is a diagram showing a group division example in a case where the 3D audio transmission data items are transmitted by two streams.

FIG. 7 shows a group division example in a case where the 3D audio transmission data items are transmitted by two streams. In this case, the main stream includes the channel coded data item (CD) classified as Group 1, and the immersive audio object coded data item (IAO) classified as Group 2.

Also, the main stream includes an SAOC (Spatial Audio Object Coding) object coded data item classified as Group 5, and an HOA (Higher Order Ambisonics) object coded data item classified as Group 6. The SAOC object coded data item is a data item that utilizes characteristics of the object data items, and performs higher compression of the object encoding. The HOA object coded data item is for aiming reproduction of a sound direction from a sound incoming direction of a microphone to a hearing position by a technology that the 3D sound is handled as a whole sound field.

The sub stream includes the speech dialog object coded data item (SDO) according to the first language classified as Group 3, and the speech dialog object coded data item (SDO) according to the second language classified as Group 4. Also, the sub stream includes a first audio description coded data item classified as Group 7, and a second audio description coded data item classified as Group 8. The audio description coded data item is for explaining content (mainly a video) with a voice, and for transmitting separately from an ordinary sound for mainly visually handicapped persons.

FIG. 8 shows the correspondence relation or the like between the group and the stream in the group division example (two divisions) in FIG. 7. The correspondence relation illustrated shows that the coded data item belonging to Group 1 is the channel coded data item, does not constitute the switch group, and is included in the stream 1. Also, the correspondence relation illustrated shows that the coded data item belonging to Group 2 is the object coded data item for immersive sound (immersive audio object coded data item), does not constitute the switch group, and is included in the stream 1.

Also, the correspondence relation illustrated shows that the coded data item belonging to Group 3 is the object coded data item for speech language (speech dialog object coded data item) according to the first language, constitutes the switch Group 1, and is included in the stream 2. Also, the correspondence relation illustrated shows that the coded data item belonging to Group 4 is the object coded data item for speech language (speech dialog object coded data item) according to the second language, constitutes the switch Group 1, and is included in the stream 2.

Also, the correspondence relation illustrated shows that the coded data item belonging to Group 5 is the SAOC object coded data item, constitutes the switch Group 2, and is included in the stream 1. Also, the correspondence relation illustrated shows that the coded data item belonging to Group 6 is the HOA object coded data item, constitutes the switch Group 2, and is included in the stream 1.

Also, the correspondence relation illustrated shows that the coded data item belonging to Group 7 is a first audio description object coded data item, constitutes the switch Group 3, and is included in the stream 2. Also, the correspondence relation illustrated shows that the coded data item belonging to Group 8 is a second audio description object coded data item, constitutes the switch Group 3, and is included in the stream 2.

Also, the correspondence relation illustrated shows that the preset Group 1 includes Group 1, Group 2, Group 3, and Group 7. Furthermore, the correspondence relation illustrated shows that the preset Group 2 includes Group 1, Group 2, Group 4, and Group 8.

Returning to FIG. 1, the service transmitter 100 inserts attribute information indicating respective attributes of the coded data items of the plurality of groups included in the 3D audio transmission data items into a layer of the container. Also, the service transmitter 100 inserts the stream correspondence relation information indicating which audio stream includes each of the coded data items of the plurality of groups into the layer of the container. In this embodiment, the stream correspondence relation information is regarded as information indicating a correspondence relation between the group ID and the stream identifier, for example.

The service transmitter 100 inserts as descriptors the attribute information and the stream correspondence relation information into the audio elementary stream loop corresponding to one or more audio streams among a predetermined number of audio streams present under a program map table (PMT: Program Map Table), for example.

Also, the service transmitter 100 inserts stream identifier information indicating respective stream identifiers of a predetermined number of audio streams into the layer of the container. The service transmitter 100 inserts as a descriptor the stream identifier information into the audio elementary stream loop corresponding to the respective predetermined number of audio streams present under the program map table (PMT: Program Map Table), for example.

Also, the service transmitter 100 inserts the attribute information indicating respective attributes of the coded data items of the plurality of groups included in the 3D audio transmission data items into a layer of the audio stream. Also, the service transmitter 100 inserts the stream correspondence relation information indicating which audio stream includes each of the coded data items of the plurality of groups into the layer of the audio stream. The service transmitter 100 inserts the attribute information and the stream correspondence relation information into a PES payload of a PES packet of one or more audio streams among the predetermined number of audio streams, for example.

Also, the service transmitter 100 inserts the stream Identifier information indicating respective streams identifier of the predetermined number of audio streams into the layer of the audio stream. The service transmitter 100 inserts the stream identifier information into the PES payload of the respective PES packets of the predetermined number of audio streams, for example.

The service transmitter 100 inserts the information Into the layer of the audio stream by inserting "Desc", i.e., the descriptor information between the "SYNC" and the "Config", as shown in FIG. 4(a), (b).

Although this embodiment illustrates that each information (the attribute information, the stream correspondence relation information, the stream identifier information) is inserted into both of the layer of the container and the layer of the audio stream as described above, it is conceived that each information is inserted into only the layer of the container or only the layer of the audio stream.

The service receiver 200 receives the transport stream TS transmitted on the broadcast wave or the net packet from the service transmitter 100. The transport stream TS includes the predetermined number of audio streams including the coded data items of the plurality of groups configuring the 3D audio transmission data items in addition to the video stream as described above.

The attribute information indicating the respective attributes of the coded data items of the plurality of groups included in the 3D audio transmission data items is inserted into the layer of the container and/or the layer of the audio stream, and the stream correspondence relation information indicating which audio stream includes each of the coded data items of the plurality of groups is inserted.

The service receiver 200 performs selectively decode processing on the audio streams including the coded data items of the group having the attributes adapted for the speaker configuration and the user selection information on the basis of the attribute information and the stream correspondence relation information, and acquires an audio output of the 3D audio.

Stream Generation Unit of Service Transmitter

Figure 9:
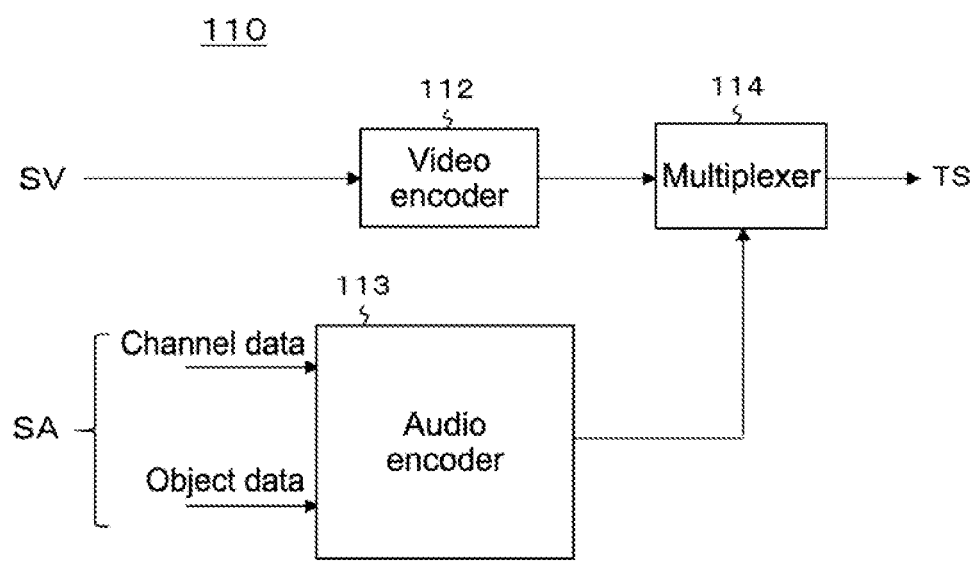
FIG. 9 is a block diagram showing a configuration example of a stream generation unit included in a service transmitter.

FIG. 9 shows a configuration example of a stream generation unit 110 included in the service transmitter 100. The stream generation unit 110 includes a video encoder 112, an audio encoder 113, and a multiplexer 114. Here, the audio transmission data item includes one coded channel data item and two object coded data items, illustratively as shown in FIG. 3.

The video encoder 112 inputs a video data item SV, encodes the video data item SV, and generates a video stream (video elementary stream). The audio encoder 113 inputs as an audio data item SA immersive audio and speech dialog object data items together with the channel data item.

The audio encoder 113 encodes the audio data item SA, and acquires the 3D audio transmission data items. The 3D audio transmission data items include the channel coded data item (CD), the immersive audio object coded data item (IAO), and the speech dialog object coded data item (SDO), as shown in FIG. 3.

The audio encoder 113 generates one or more audio streams (audio elementary streams) including the coded data items of a plurality of groups, here, four groups (see FIG. 4(a), (b)). At this time, the audio encoder 113 inserts the descriptor information ("Desc") including the attribute information, the stream correspondence relation information, and the stream identifier information between the "SYNC" and the "Config", as described above.

The multiplexer 114 PES-packetizes each of the video stream output from the video encoder 112 and the predetermined number of audio streams output from the audio encoder 113, further transport-packetizes the audio streams for multiplexing, and acquires the transport stream TS as a multiplexed stream.

Also, the multiplexer 114 inserts the attribute information indicating the respective attributes of the coded data items of the plurality of groups and the stream correspondence relation information indicating which audio stream includes each of the coded data items of the plurality of groups under the program map table (PMT). The multiplexer 114 inserts the information into an audio elementary stream loop corresponding to at least one or more of the audio streams among the predetermined number of audio streams using a 3D audio stream config descriptor (3Daudio_stream_config_descriptor). Details of the descriptor will be described later.

In addition, the multiplexer 114 inserts the stream identifier information indicating the respective stream identifiers of the predetermined number of audio streams under the program map table (PMT). The multiplexer 114 inserts the information into the audio elementary stream loop corresponding to the respective predetermined number of audio streams using the 3D audio stream ID descriptor (3Daudio_substreamID_descriptor). Details of the descriptor will be described later.

An operation of the stream generation unit 110 shown in FIG. 9 will be briefly described. A video data item is supplied to the video encoder 112. In the video encoder 112, a video data item SV is encoded, and a video stream including the coded video data item is generated. The video stream is supplied to the multiplexer 114.

The audio data item SA is supplied to the audio encoder 113. The audio data item SA includes the object data items of the channel data item, the immersive audio and the speech dialog. In the audio encoder 113, the audio data item SA is encoded, and the 3D audio transmission data items are acquired.

The 3D audio transmission data items include the immersive audio object coded data item (IAO) and the speech dialog object coded data item (SDO) in addition to the channel coded data item (CD) (see FIG. 3). In the audio encoder 113, one or more audio streams including the coded data items of four groups are generated (see FIG. 4(a), (b)).

At this time, the audio encoder 113 inserts the descriptor information ("Desc") including the attribute information, the stream correspondence relation information, and the stream identifier information as described above between the "SYNC" and the "Config".

The video stream generated at the video encoder 112 is supplied to the multiplexer 114. Also, the audio stream generated at the audio encoder 113 is supplied to the multiplexer 114. In the multiplexer 114, the stream supplied from each encoder is PES-packetized and is transport-packetized for multiplexing, and the transport stream TS is acquired as the multiplexed stream.

Also, in the multiplexer 114, a 3D audio stream config descriptor is inserted into the audio elementary stream loop corresponding to at least one or more audio streams among the predetermined number of audio streams, for example. The descriptor includes the attribute information indicating the respective attributes of the coded data items of the plurality of groups, and the stream correspondence relation information indicating which audio stream includes each of the coded data items of the plurality of groups.

Also, in the descriptor 114, the 3D audio stream ID descriptor is inserted into the audio elementary stream loop corresponding to the respective predetermined number of audio streams. The descriptor includes the stream identifier information indicating the respective stream identifiers of the predetermined number of audio streams.

Details of 3D Audio Stream Config Descriptor

FIG. 10 shows a configuration example (Syntax) of the 3D audio stream config descriptor (3Daudio_stream_config_descriptor). In addition, FIG. 11 shows contents (Semantics) of principal information in the configuration example.

An 8 bit field of "descriptor_tag" indicates a descriptor type. Here, it shows that it is a 3D audio stream config descriptor. An 8 bit field of "descriptor_length" indicates a descriptor length (size), and shows a subsequent number of bytes as the descriptor length.

An 8 bit field of "NumOfGroups, N" indicates the number of the groups. An 8 bit field of "NumOfPresetGroups, P" indicates the number of the preset groups. For the number of groups, an 8 bit field of "groupID", an 8 bit field of "attribute_of_groupID", an 8 bit field of "SwitchGroupID" and an 8 bit field of "audio_streamID" are repeated.

The field of "groupID" indicates an identifier of the group. The field of "attribute_of_groupID" indicates a concerned attribute of the coded data item of the group. The field of "SwitchGroupID" is an identifier indicating the switch group to which a concerned group belongs. "0" indicates that it does not belong to any switch group. Other than "0" indicates the switch group to which it belongs. An 8 bit field of "contentKind" indicates kinds of contents of the group. "audio_streamID" is an identifier indicating an audio stream including the concerned group. FIG. 12 shows kinds of contents defined in "contentKind".

For the number of preset groups, an 8 bit field of "presetGroupID", and an 8 bit field of "NumOfGroups_in_preset, R" are repeated. The field of "presetGroupID" is an identifier indicating a bundle where the group is preset. The field of "NumOfGroups_in_preset, R" indicates the number of group belonging to the preset group. Every preset group, for the number of the groups belonging thereto, an 8 bit field of "groupID" is repeated, and the groups belonging to the preset group are shown. The descriptor may be disposed under an extended descriptor.

Details of 3D Audio Stream ID Descriptor

FIG. 13(a) shows a configuration example (Syntax) of the 3D audio stream ID descriptor (3Daudio_substreamID_descriptor). FIG. 13(b) shows contents (Semantics) of principal information in the configuration example.

An 8 bit field of "descriptor_tag" indicates a descriptor type. Here, it shows that it is the 3D audio stream ID descriptor. An 8 bit field of "descriptor length" indicates a descriptor length (size), and indicates a subsequent number of bytes as the descriptor length. An 8 bit field of "audio_streamID" indicates an identifier of the audio stream. The descriptor may be disposed under an extended descriptor.

Configuration of Transport Stream TS

Figure 14:
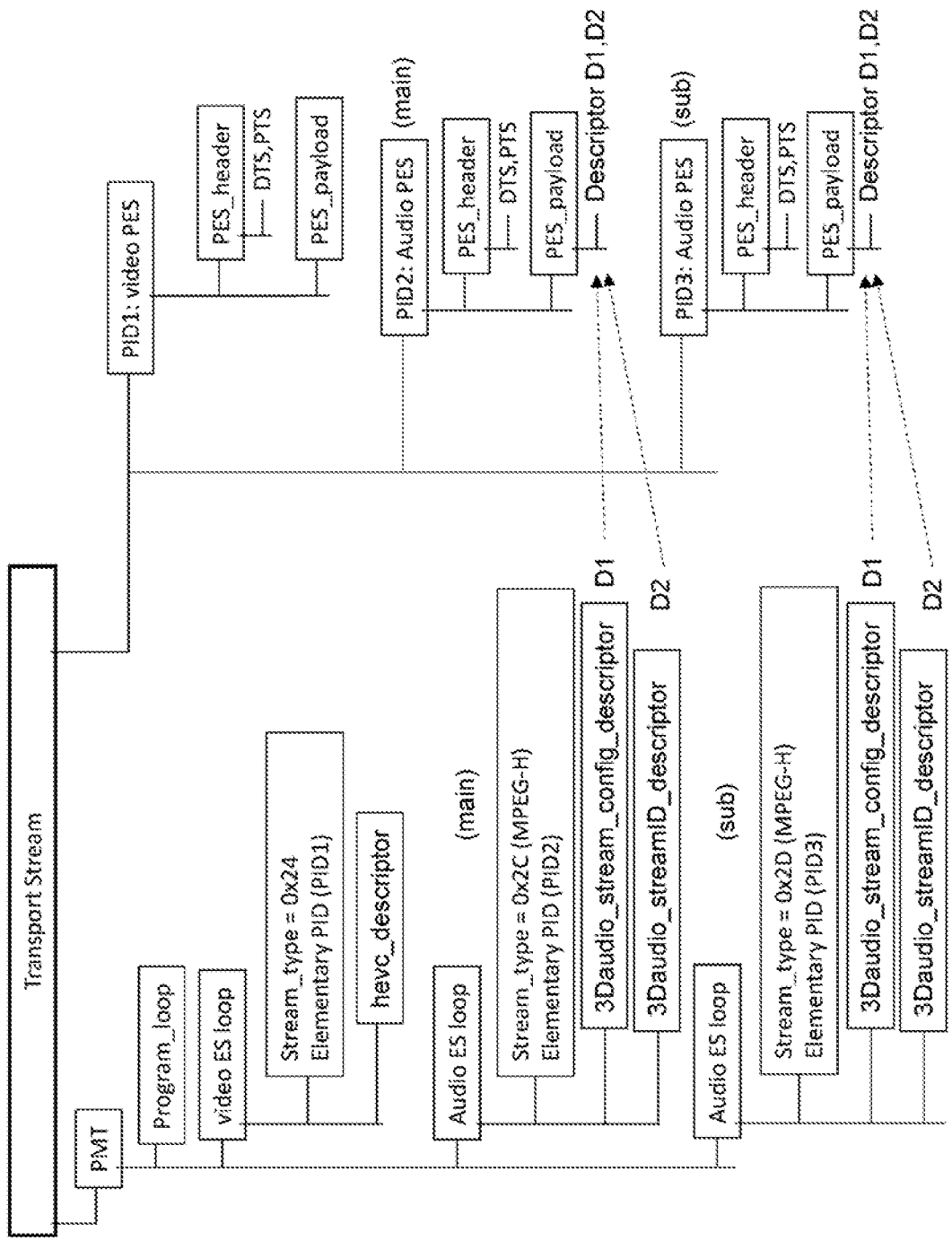
FIG. 14 is a diagram showing a configuration example of a transport stream.

FIG. 14 shows a configuration example of the transport stream TS. The configuration example corresponds to the case that the 3D audio transmission data items are transmitted by two streams (see FIG. 5). In the configuration example, there exists a video stream PES packet "video FES" identified by PID1. Also, in the configuration example, there exist two audio stream FES packets "audio PES" identified by PID2 and PID3, respectively. The PES packet includes a PES header (PES_header) and a PES payload (PES_payload). Into the PES header, DTS and PTS time stamps are inserted. Upon multiplexing, PID2 and PID3 time stamps are matched to provide accuracy, whereby synchronization between them can be ensured in a whole system.

Here, an audio stream PES packet "audio PES" identified by the PID2 includes the channel coded data item (CD) classified as Group 1, and the immersive audio object coded data item (IAO) classified as Group 2. Also, an audio stream PES packet "audio PES" identified by the PID3 includes the speech dialog object coded data item (SDO) according to the first language classified as Group 3, and the speech dialog object coded data item (SDO) according to the second language classified as Group 4.

Also, the transport stream TS includes a PM (Program Map Table) as PSI (Program Specific Information). The PSI is information describing which program each elementary stream included in the transport stream belongs to. A program loop (Program loop) that describes information about a whole program is present at the PMT.

Also, an elementary stream loop having information about each elementary stream is present at the PMT. In the configuration example, a video elementary stream loop (video ES loop) corresponding to the video stream is present, and an audio elementary stream loop (audio ES loop) corresponding to two audio streams is present.

At the video elementary stream loop (video ES loop), information about a stream type, a PID (packet identifier), etc. is disposed corresponding to the video stream, and a descriptor that describes the information relating to the video stream is also disposed. A value of the video stream "Stream_type" is set to "0x24", and the PID information indicates the PID1 added to the video stream PES packet "video PES", as described above. As one of the descriptors, an HEVC descriptor is disposed.

At each audio elementary stream loop (audio ES loop), information about the stream type, the PID (packet identifier), etc. is disposed corresponding to the audio stream, and a descriptor that describes the information relating to the audio stream is also disposed. The PID2 is a main audio stream, and a value of "Stream_type" is set to "0x2C", and the PID information indicates the PID added to the audio stream PES packet "audio PES", as described above. Also, the PID3 is a sub audio stream, and a value of "Stream_type" is set to "0x2D", and the PID information indicates the PID added to the audio stream PES packet "audio PES", as described above.

Also, at each audio elementary stream loop (audio ES loop), both of the above-described 3D audio stream config descriptor and the 3D audio stream ID descriptor are disposed.

Also, the descriptor information is inserted into the PES payload of the PES packet of each audio elementary stream. The descriptor information is the "Desc" inserted between the "SYNC" and the "Config", as described above (see FIG. 4). Assuming that information included in the 3D audio stream config descriptor is denoted as D1, and information included in the 3D audio stream ID descriptor is denoted as D2, the descriptor information includes "D1+D2" information.

Configuration Example of Service Receiver

Figure 15:
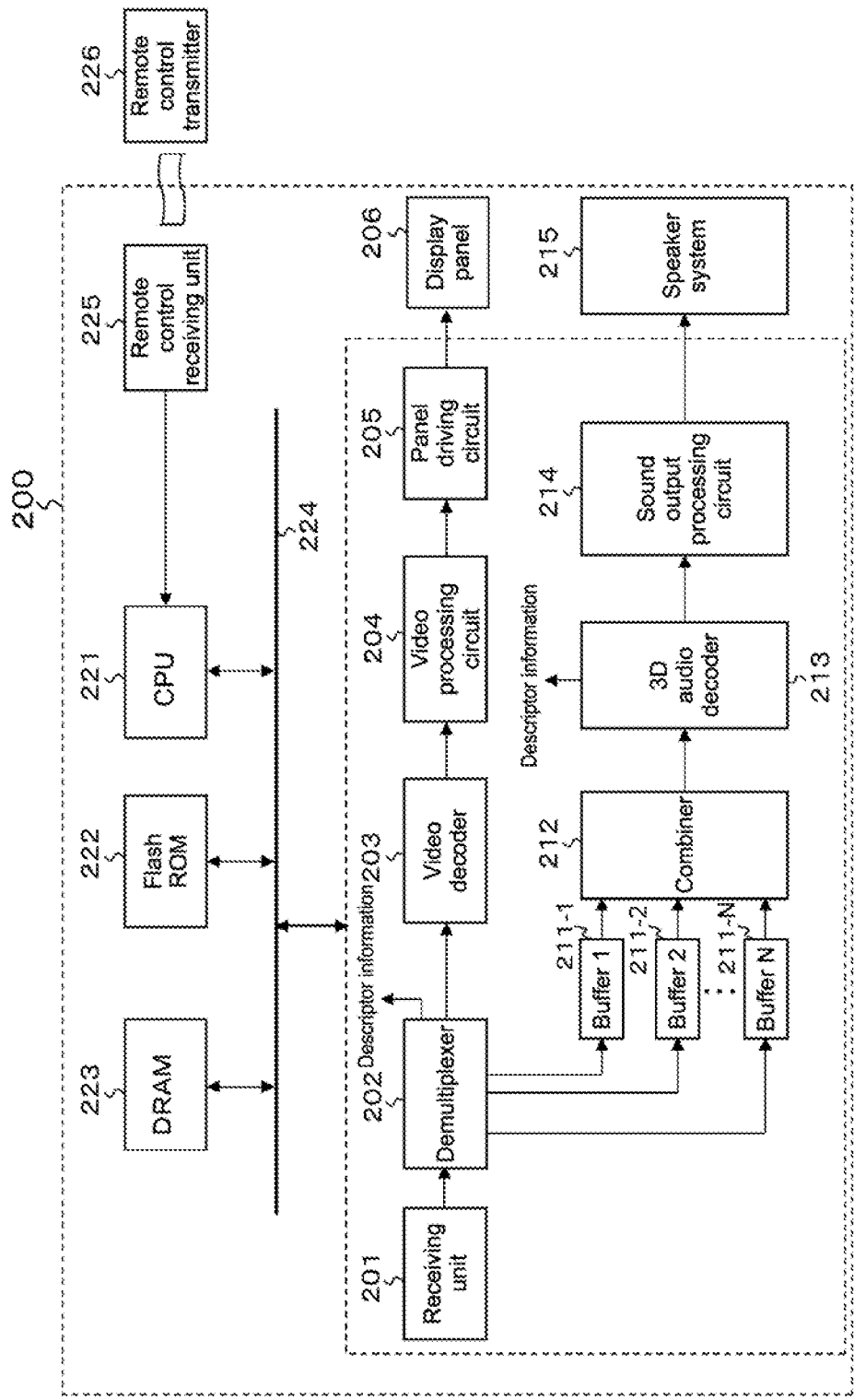
FIG. 15 is a block diagram showing a configuration example of a service receiver.

FIG. 15 shows a configuration example of the service receiver 200. The service receiver 200 includes a receiving unit 201, a demultiplexer 202, a video decoder 203, a video processing circuit 204, a panel driving circuit 205, and a display panel 206. Also, the service receiver 200 includes multiplexing buffers 211-1 to 211-N, a combiner 212, a 3D audio decoder 213, a sound output processing circuit 214, and a speaker system 215. Also, the service receiver 200 includes a CPU 221, a flash ROM 222, a DRAM 223, an internal bus 224, a remote control receiving unit 225, and a remote control transmitter 226.

The CPU 221 controls an operation of each unit in the service receiver 200. The flash ROM 222 stores control software, and saves data. The DRAM 223 configures a work area of the CPU 221. The CPU 221 decompresses software or data read out from the flash ROM 222 onto the DRAM 223 to start up the software, and controls each unit in the service receiver 200.

The remote control receiving unit 225 receives a remote control signal (remote control code) transmitted from the remote control transmitter 226, and supplies it to the CPU 221. The CPU 221 controls each unit in the service receiver 200 on the basis of the remote control code. The CPU 221, the flash ROM 222 and the DRAM 223 are connected to the internal bus 224.

The receiving unit 201 receives the transport stream TS transmitted on the broadcast wave or the net packet from the service transmitter 100. The transport stream TS includes the predetermined number of audio streams including the coded data items of the plurality of groups configuring the 3D audio transmission data items in addition to the video stream.

Figure 16:
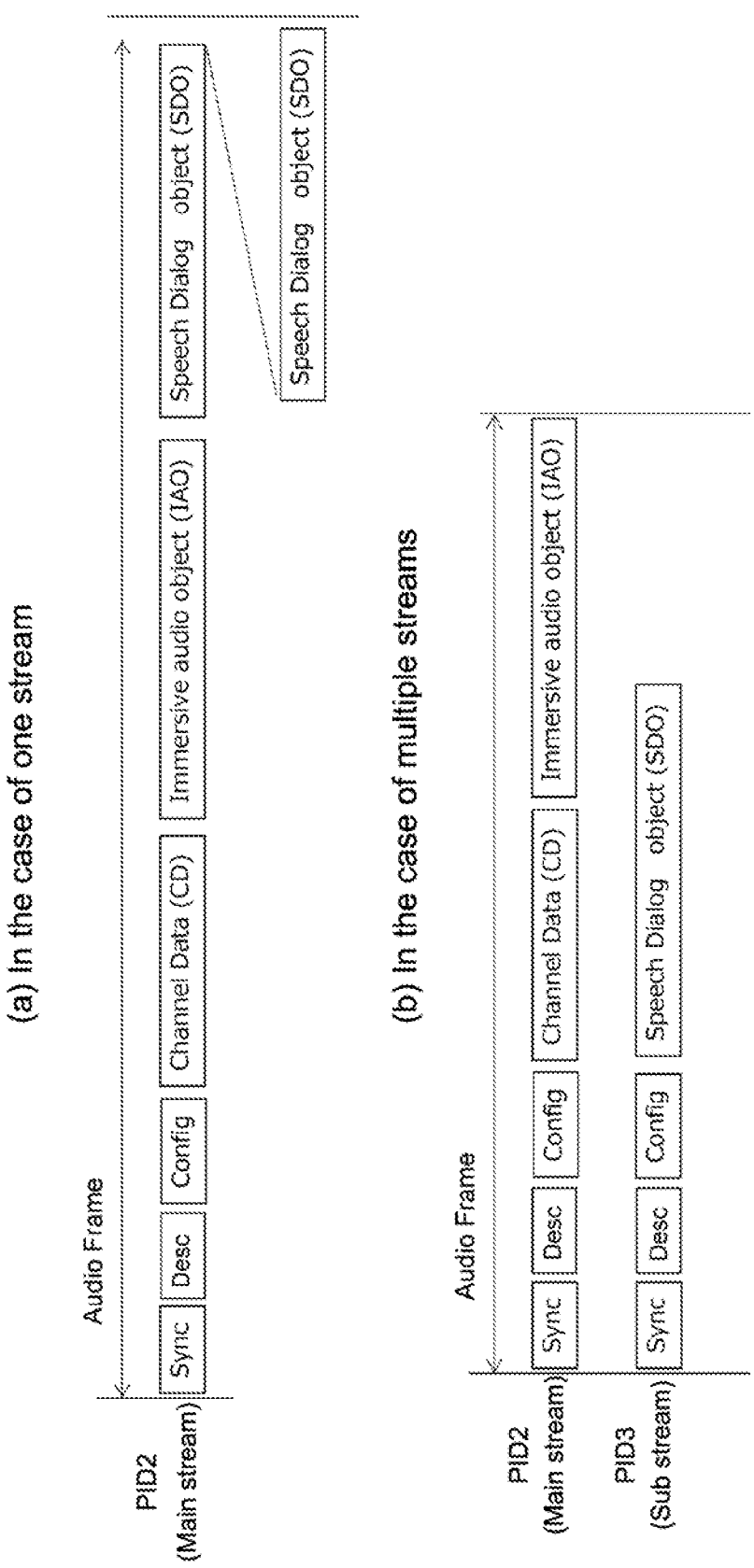
FIG. 16 is a diagram showing an example of a received audio stream.

FIG. 16 shows an example of the received audio stream. FIG. 16(a) shows an example of one stream (main stream). The stream includes the channel coded data item (CD), the immersive audio object coded data item (IAO), the speech dialog object coded data item (SDO) together with the "SYNC" and the "Config". The stream is identified by the PID2.

Also, between the "SYNC" and the "Config", the descriptor information ("Desc") is included. Into the descriptor information, the attribute information indicating the respective attributes of the coded data items of the plurality of groups, the stream correspondence relation information indicating which audio stream includes each of the coded data items of the plurality of groups, and the stream identifier information indicating own stream identifier are inserted.

FIG. 16(b) shows an example of two streams. The main stream identified by the PID2 includes the channel coded data item (CD) and the immersive audio object coded data item (IAO) together with the "SYNC" and the "Config". Also, the sub stream identified by the PID3 includes the speech dialog object ceded data item (SDO) together with the "SYNC" and the "Config".

Also, each stream includes the descriptor information ("Desc") between SYNC" and the "Config". Into the descriptor information, the attribute information indicating the respective attributes of the coded data items of the plurality of groups, the stream correspondence relation information indicating which audio stream includes each of the coded data items of the plurality of groups, and the stream identifier information indicating own stream identifier are inserted.

The demultiplexer 202 extracts a video stream packet from the transport stream TS, and transmits it to the video decoder 203. The video decoder 203 reconfigures the video stream from the video packet extracted at the demultiplexer 202, and performs decode processing to acquire uncompressed video data items.

The video processing circuit 204 performs scaling processing, image quality adjustment processing or the like to the video data items acquired at the video decoder 203, thereby acquiring video data items for displaying. The panel, driving circuit 205 drives the display panel 206 on the basis of the image data items for displaying acquired at the video processing circuit 204. The display panel 206 includes, for example, an LCD (Liquid Crystal Display), an organic EL display (organic electroluminescence display), or the like.

Also, the demultiplexer 202 extracts various information such as the descriptor information from the transport stream TS, and transmits it to the CPU 221. The various information also includes the above-described information about the 3D audio stream config descriptor (3Daudio_stream_config_descriptor) and the 3D audio stream ID descriptor (3Daudio_substreamID_descriptor) (see FIG. 14).

The CPU 221 recognizes the audio stream including the coded data items of the group having the attributes adapted for the speaker configuration and viewer and audience (user) selection information on the basis of the attribute information indicating the attributes of the coded data items of each group included in the descriptor information, and the stream relation information indicating which audio stream includes each group.

In addition, the demultiplexer 202 selectively takes out by a PID filter under the control by the CPU 221 one or more audio stream packets including the coded data items of the group having the attributes adapted for the speaker configuration and viewer and audience (user) selection information among the predetermined number of audio streams that the transport stream TS has.

The multiplexing buffers 211-1 to 211-N each takes in each audio stream taken out at the demultiplexer 202. Here, N numbers of the multiplexing buffers 211-1 to 211-N are necessary and sufficient. In an actual operation, the numbers of the audio streams taken out at the demultiplexer 202 will be used.

The combiner 212 reads out the audio stream every audio frame from the multiplexing buffer where each audio stream taken out at the demultiplexer 202 is taken in among the multiplexing buffers 211-1 to 211-N, and transmits it to the 3D audio decoder 213.

In a case where the audio stream supplied from the combiner 212 includes the descriptor information ("Desc"), the 3D audio decoder 213 transmits the descriptor information to the CPU 221. The 3D audio decoder 213 selectively takes out the coded data items of the group having the attributes adapted for the speaker configuration and viewer and audience (user) selection information under the control by the CPU 221, performs decode processing, and acquires the audio data item for driving each speaker of the speaker system 215.

Here, the coded data item to which the decode processing is applied may have three patterns: only the channel coded data item is included, only the object coded data item is included, or both of the channel coded data item and the object coded data item are included.

When decoding the channel coded data item, the 3D audio decoder 213 performs downmix or upmix processing on the speaker configuration of the speaker system 215, and acquires the audio data item for driving each speaker. In addition, when decoding the object coded data item, the 3D audio decoder 213 calculates speaker rendering (mixing ratio to each speaker) on the basis of object information (metadata item), and mixes the object audio data item into the audio data item for driving each speaker in accordance with the calculation result.

The sound output processing circuit 214 performs necessary processing such as D/A conversion, amplification and the like on the audio data item for driving each speaker acquired at the 3D audio decoder 213, and supplies it to the speaker system 215. The speaker system 215 includes a plurality of speakers having a plurality of channels, for example, 2 channels, 5.1 channels, 7.1 channels, or 22.2 channels.

The operation of the service receiver 200 shown in FIG. 15 will be briefly described. The receiving unit 201 receives the transport stream TS transmitted on the broadcast wave or the net packet from the service transmitter 100. The transport stream TS includes the predetermined number of audio streams including the coded data items of the plurality of groups configuring the 3D audio transmission data items in addition to the video stream. The transport stream TS is supplied to the demultiplexer 202.

In the demultiplexer 202, the video stream packet is extracted from the transport stream TS, which is supplied to the video decoder 203. In the video decoder 203, the video stream is reconfigured from the video packet extracted at the demultiplexer 202, the decode processing is performed, and uncompressed video data items are acquired. The video data items are supplied to the video processing circuit 204.

The video processing circuit 204 performs scaling processing, image quality adjustment processing or the like on the video data items acquired at the video decoder 203, thereby acquiring video data items for displaying. The video data items for displaying are supplied to the panel driving circuit 205. The panel driving circuit 205 drives the display panel 206 on the basis of the image data items for displaying. In this manner, images corresponding to the image data items for displaying are displayed on the display panel 206.

Also, the demultiplexer 202 extracts various information such as the descriptor information from the transport stream TS, which is sent to the CPU 221. The various information also includes information about the 3D audio stream config descriptor and the 3D audio stream ID descriptor. The CPU 221 recognizes the audio stream including the coded data items of the group having the attributes adapted for the speaker configuration and viewer and audience (user) selection information on the basis of the attribute information included in the descriptor information and the stream relation information.

In addition, the demultiplexer 202 selectively takes out by the PID filter under the control by the CPU 221 one or more audio stream packets including the coded data items of the group having the attributes adapted for the speaker configuration and viewer and audience selection information among the predetermined number of audio streams that the transport stream TS has.

The audio stream taken out at the demultiplexer 202 is taken in the corresponding multiplexing buffer among the multiplexing buffers 211-1 to 211-N. In the combiner 212, the audio stream is read out every audio frame from each multiplexing buffer where the audio stream is taken in, and is supplied to the 3D audio decoder 213.

In a case where the audio stream supplied from the combiner 212 includes the descriptor information ("Desc"), the descriptor information is extracted and transmitted to the CPU 221 in the 3D audio decoder 213. The 3D audio decoder 213 selectively takes out the coded data items of the group having the attributes adapted for the speaker configuration and viewer and audience (user) selection information under the control by the CPU 221, performs decode processing, and acquires the audio data item for driving each speaker of the speaker system 215.

Here, when the channel coded data item is decoded, downmix or upmix processing is performed on the speaker configuration of the speaker system 215, and the audio data item for driving each speaker is acquired. In addition, when the object coded data item is decoded, speaker rendering (mixing ratio to each speaker) is calculated on the basis of object information (metadata item), and the object audio data item is mixed into the audio data item for driving each speaker in accordance with the calculation result.

The audio data item for driving each speaker acquired at the 3D audio decoder 213 is supplied to the sound output processing circuit 214. The sound output processing circuit 214 performs necessary processing such as D/A conversion, amplification and the like on the audio data item for driving each speaker. The audio data item after processing is supplied to the speaker system 215. In this manner, an audio output corresponding to a display image of the display panel 206 is acquired from the speaker system 215.

Figure 17:
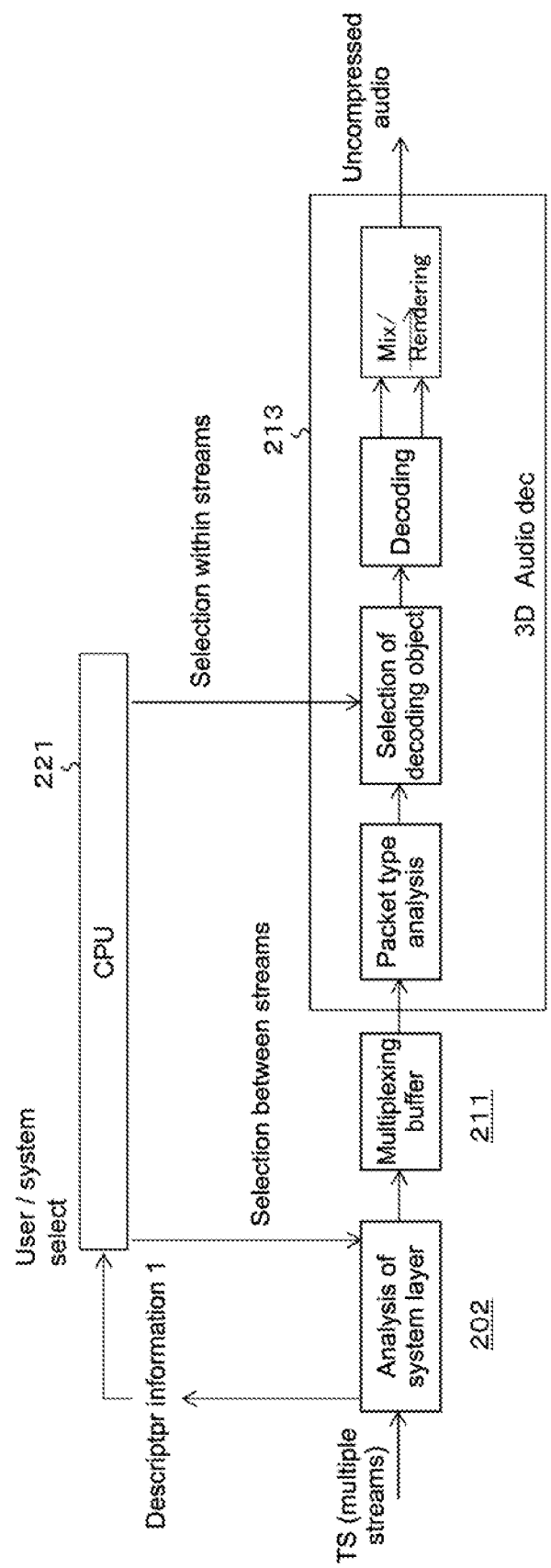
FIG. 17 is a diagram schematically showing decode processing in a case where descriptor information is not present within the audio stream.

FIG. 17 schematically shows decode processing in a case where the descriptor information is not present within the audio stream. The transport stream TS that is the multiplexed stream is input to the demultiplexer 202. In the demultiplexer 202, a system layer is analyzed, and descriptor information 1 (information about 3D audio stream config descriptor or 3D audio stream ID descriptor) is supplied to the CPU 221.

In the CPU 221, the audio stream including the coded data items of the group having the attributes adapted for the speaker configuration and viewer and audience (user) selection information is recognized on the basis of the descriptor information 1. In the demultiplexer 202, selection between the streams is performed under the control by the CPU 221.

In other words, in the demultiplexer 202, the PID filter selectively takes out one or more audio stream packets including the coded data items of the group having the attributes adapted for the speaker configuration and viewer and audience selection information among the predetermined number of audio streams of the transport stream TS. The thus taken out audio streams are taken in the multiplexing buffers 211 (211-1 to 211-N).

The 3D audio decoder 213 performs a packet type analysis of each audio stream taken in the multiplexing buffer 211. Then, in the demultiplexer 202 selection within the streams is performed under the control by the CPU 221 based on the above-described descriptor information 1.

Specifically, the coded data items of the group having the attributes adapted for the speaker configuration and viewer and audience (user) selection information are selectively taken out from each audio stream as a decoding object, and the decode processing and mixing rendering processing are applied thereto, thereby acquiring the audio data item (uncompressed audio) for driving each speaker.

Figure 18:
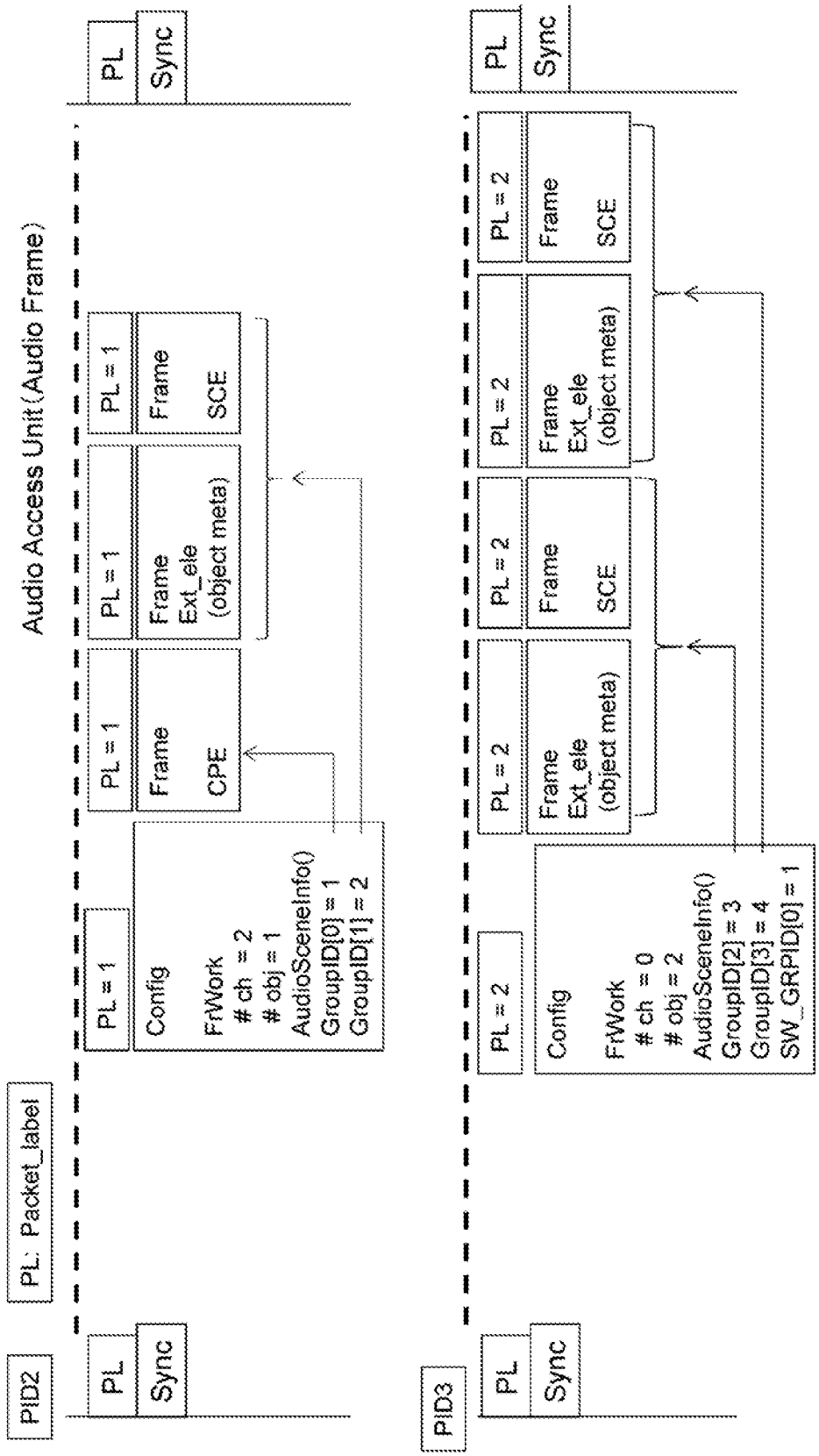
FIG. 18 is a diagram showing a configuration example of an audio access unit (audio frame) of the audio stream in a case where the descriptor information is not present within the audio stream.

FIG. 18 shows a configuration example of an audio access unit (audio frame) of the audio stream in a case where the descriptor information is not present within the audio stream. Here, an example of two streams is shown.

In relation to the audio stream identified by the PID2, information of "FrWork # ch=2, # obj=1" included in the "Config" indicates presence of the "Frame" including the channel coded data items in two channels and one object coded data item. Information of "GroupID[0]=1, GroupID [1]=2" registered in this order within "AudioSceneInfo ( )" included in the "Config" indicates that the "Frame" having the coded data items of Group 1 and the "Frame" having the coded data items of Group 2 are disposed in this order. Note that a value of the packet label (PL) is regarded as the same in the "Config" and each "Frame" corresponding thereto.

Here, the "Frame" having the coded data items of Group 1 includes a coded sample data item of the CPE (Channel Pair Element). Also, the "Frame" having the coded data items of Group 2 includes the "Frame" having the metadata item as an extension element (Ext_element), and the "Frame" having the coded sample data item of the SCE (Single Channel Element).

In relation to the audio stream identified by the PID3, information of "FrWork # ch=0, # obj=2" included in the "Config" indicates presence of the "Frame" including two object coded data items. Information of "GroupID[2]=3, GroupID[3]=4, SW_GRPID[0]=1" registered in this order within "AudioSceneInfo ( )" included in the "Config" indicates that the "Frame" having the coded data items of Group 3 and the "Frame" having the coded data items of Group 4 are disposed in this order, and that these groups configure the switch Group 1. Note that a value of the packet label (PL) is regarded as the same in the "Config" and each "Frame" corresponding thereto.

Here, the "Frame" having the coded data items of Group 3 includes the "Frame" having the metadata item as an extension element (Ext_element) and the "Frame" having the coded sample data item of the SCE (Single Channel Element). Similarly, the "Frame" having the coded data items of Group 4 includes the "Frame" having the metadata item as an extension element (Ext_element) and the "Frame" having the coded sample data item of the SCE (Single Channel Element).

Figure 19:
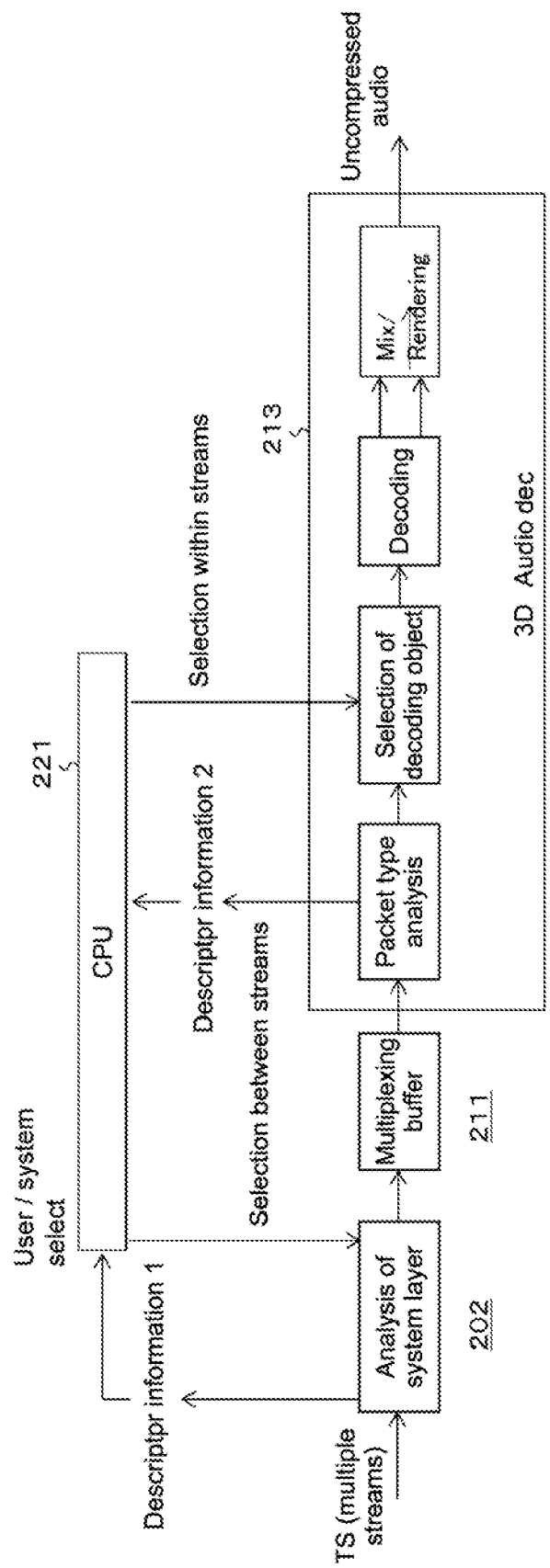
FIG. 19 is a diagram schematically showing decode processing in a case where descriptor information is present within the audio stream.

FIG. 19 schematically shows decode processing in a case where descriptor information is present within the audio stream. The transport stream TS that is the multiplexed stream is input to the demultiplexer 202. In the demultiplexer 202, a system layer is analyzed, and the descriptor information 1 (information about 3D audio stream config descriptor or 3D audio stream ID descriptor) is supplied to the CPU 221.

In the CPU 221, the audio stream including the coded data items of the group having the attributes adapted for the speaker configuration and Viewer and audience (user) selection information is recognized on the basis of the descriptor information 1. In the demultiplexer 202, selection between the streams is performed under the control by the CPU 221.

In other words, the demultiplexer 202 selectively takes out by the PID filter one or more audio stream packets including the coded data items of the group having the attributes adapted for the speaker configuration and viewer and audience selection information among the predetermined number of audio streams that the transport stream TS has. The thus taken out audio streams are taken in the multiplexing buffers 211 (211-1 to 211-N).

The 3D audio decoder 213 performs a packet type analysis of each audio stream taken in the multiplexing buffer 211, and descriptor information 2 present within the audio stream is sent to the CPU 221. Presence of the coded data items of the group having the attributes adapted for the speaker configuration and viewer and audience (user) selection information is recognized on the basis of the descriptor information 2. Then, in the demultiplexer 202, selection within the streams is performed under the control by the CPU 221 based on the descriptor information 2.

Specifically, the coded data items of the group having the attributes adapted for the speaker configuration and viewer and audience (user) selection information are selectively taken out from each audio stream as a decoding object, and the decode processing and mixing rendering processing are applied thereto, thereby acquiring the audio data item (uncompressed audio) for driving each speaker.

Figure 20:
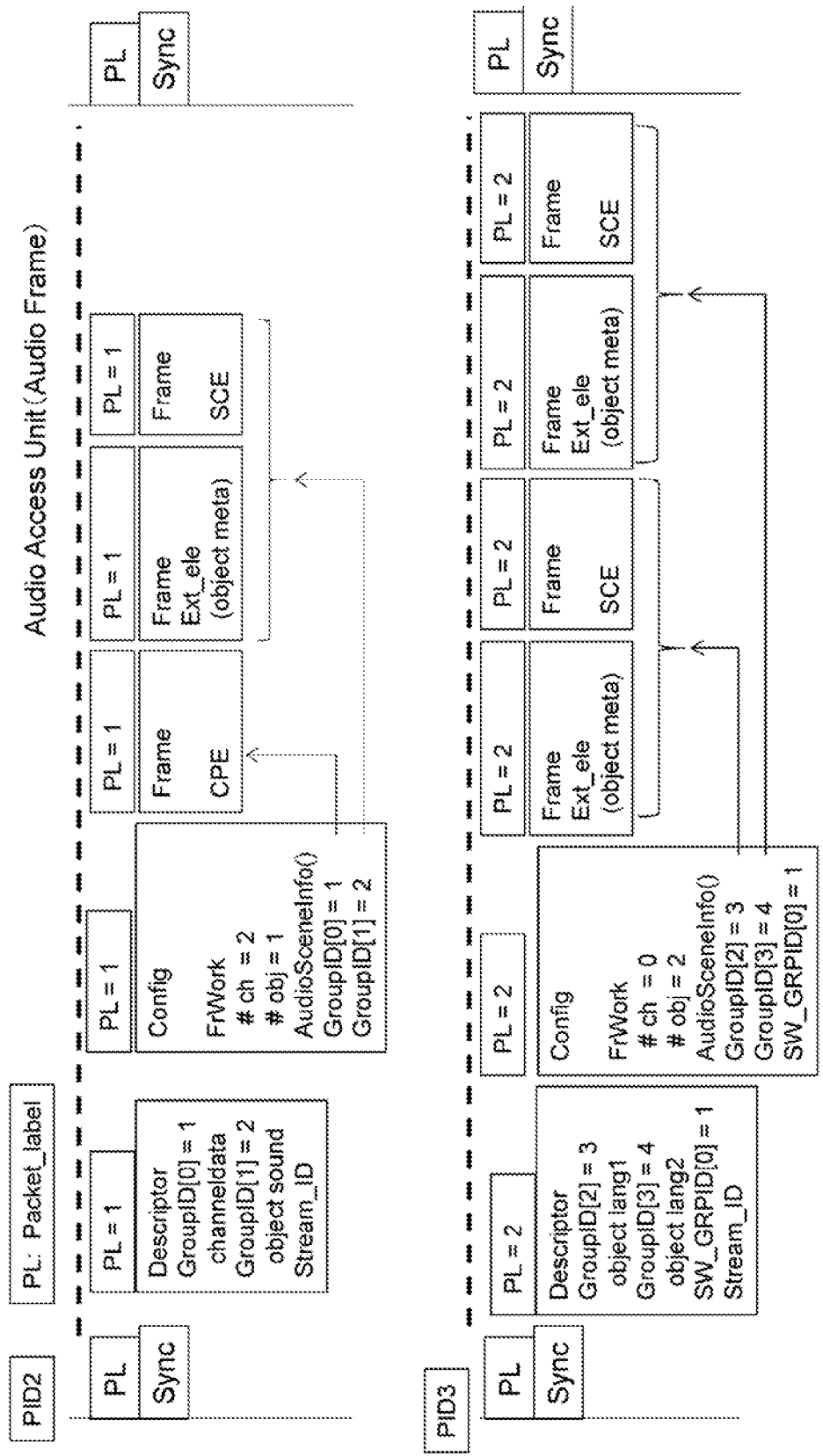
FIG. 20 is a diagram showing a configuration example of an audio access unit (audio frame) of the audio stream in a case where the descriptor information is present within the audio stream.

FIG. 20 shows a configuration example of an audio access unit (audio frame) of the audio stream in a case where descriptor information is present within the audio stream. Here, an example of two streams is shown. FIG. 20 is similar to FIG. 18 except that the "Desc", i.e., the descriptor information, is inserted between the "SYNC" and the "Config".

In relation to the audio stream identified by the PID2, information of "GroupID[0]=1, channeldata" included in the "Desc" indicates that the coded data item of Group 1 is the channel coded data item. Information of "GroupID[1]=2, object sound" included in the "Desc" indicates that the coded data item of Group 2 is the object coded data item for immersive sound. Furthermore, information of "Stream_ID" indicates a stream identifier of the audio stream.

In relation to the audio stream identified by the PID3, information of "GroupID[2]=3, object lang1" included in the "Desc" indicates that the coded data item of Group 3 is the object coded data item for speech language according to the first language. Information of "GroupID[3]=4, object lang1" included in the "Desc" indicates that the coded data item of Group 4 is the object coded data item for speech language according to the second language. In addition, information of "SW_GRPID[0]=1" included in the "Desc" indicates that the groups 3 and 4 configures the switch Group 1. Furthermore, information of "Stream_ID" indicates a stream identifier of the audio stream.

Figure 21:
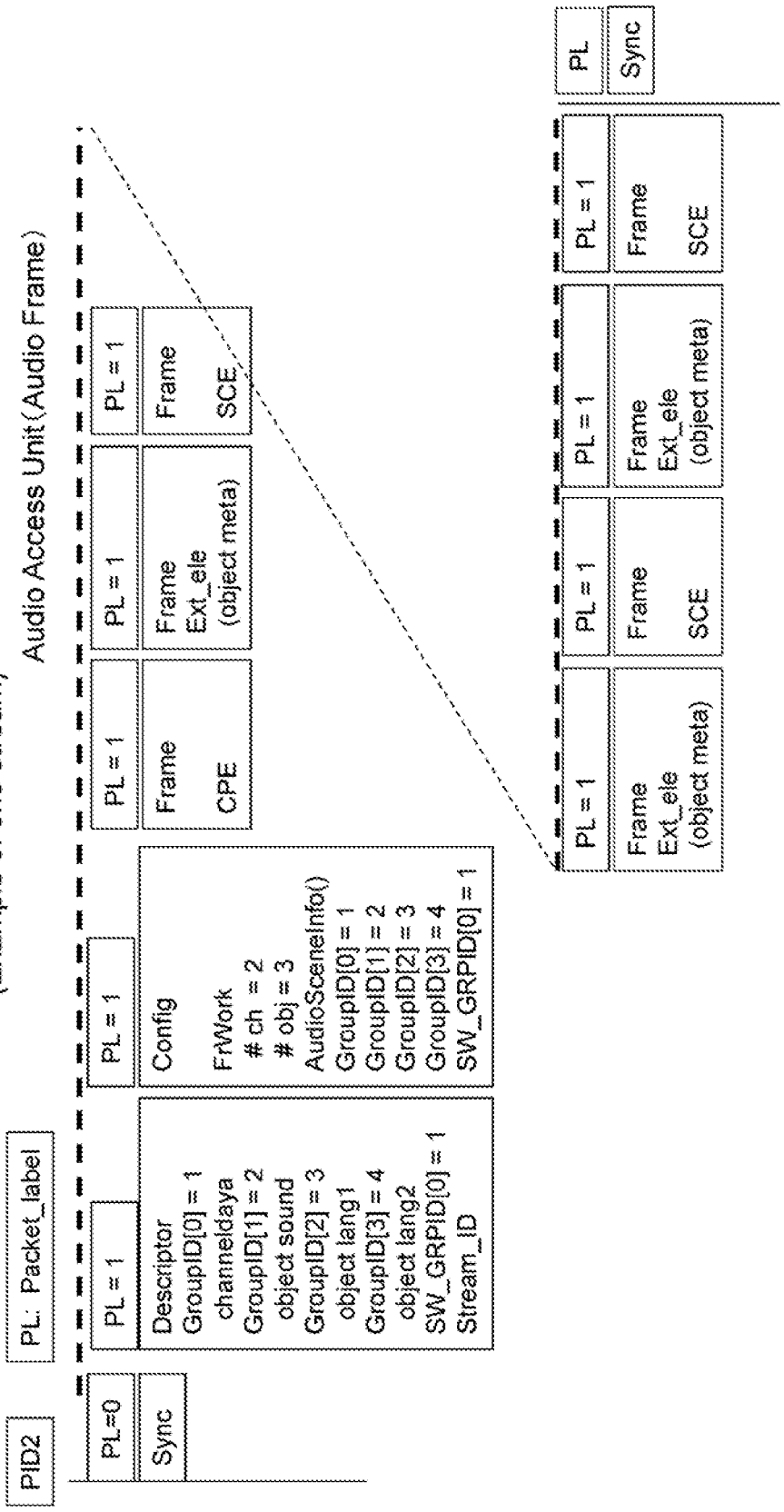
FIG. 21 is a diagram showing other configuration example of an audio access unit (audio frame) of the audio stream in a case where the descriptor information is present within the audio stream.

FIG. 21 shows a configuration example of an audio access unit (audio frame) of the audio stream in a case where the descriptor information is present within the audio stream. Here, an example of one stream is shown.

Information of "FrWork # ch=2, # obj=3" included in the "Config" indicates presence of the "Frame" including the channel coded data items in two channels and three object coded data items. Information of "GroupID[0]=1, GroupID[1]=2, GroupID[2]=3, GroupID[3]=4, SW_GRPID[0]=1" registered in this order within "AudioSceneInfo ( )" included in the "Config" indicates that the "Frame" having the coded data item of Group 1, and the "Frame" having the coded data item of Group 2, the "Frame" having the coded data item of Group 3 and the "Frame" having the coded data item of Group 4 are disposed in this order, and that these groups 3 and 4 configure the switch Group 1. Note that a value of the packet label (PL) is regarded as the same in the "Config" and each "Frame" corresponding thereto.

Here, the "Frame" having the coded data items of Group 1 includes coded sample data items of the CPE (Channel Pair Element). Also, the "Frame" having the coded data items of the groups 2 to 4 includes the "Frame" having the metadata item as an extension element (Ext_element), and the "Frame" having the coded sample data item of the SCE (Single Channel Element).

Information of "GroupID[0]=1, channeldata" included in the "Desc" indicates that the coded data item of Group 3 is the channel coded data item. Information of "GroupID[1]=2, object sound" included in the "Desc" indicates that the coded data item of Group 2 is the object coded data item for immersive sound.

Information of "GroupID[2]=3, object lang1" included in the "Desc" indicates that the coded data item of Group 3 is the object coded data item for speech language according to the first language. Information of "GroupID[3]=4, object lang2" included in the "Desc" indicates that the coded data item of Group 4 is the object coded data item for speech language according to the second language. Also, information of "SW_GRPID[0]=1" included in the "Desc" indicates that the groups 3 and 4 constitute the switch Group 1. Furthermore, information of "Stream_ID" indicates the stream identifier of the audio stream.

Figure 22:
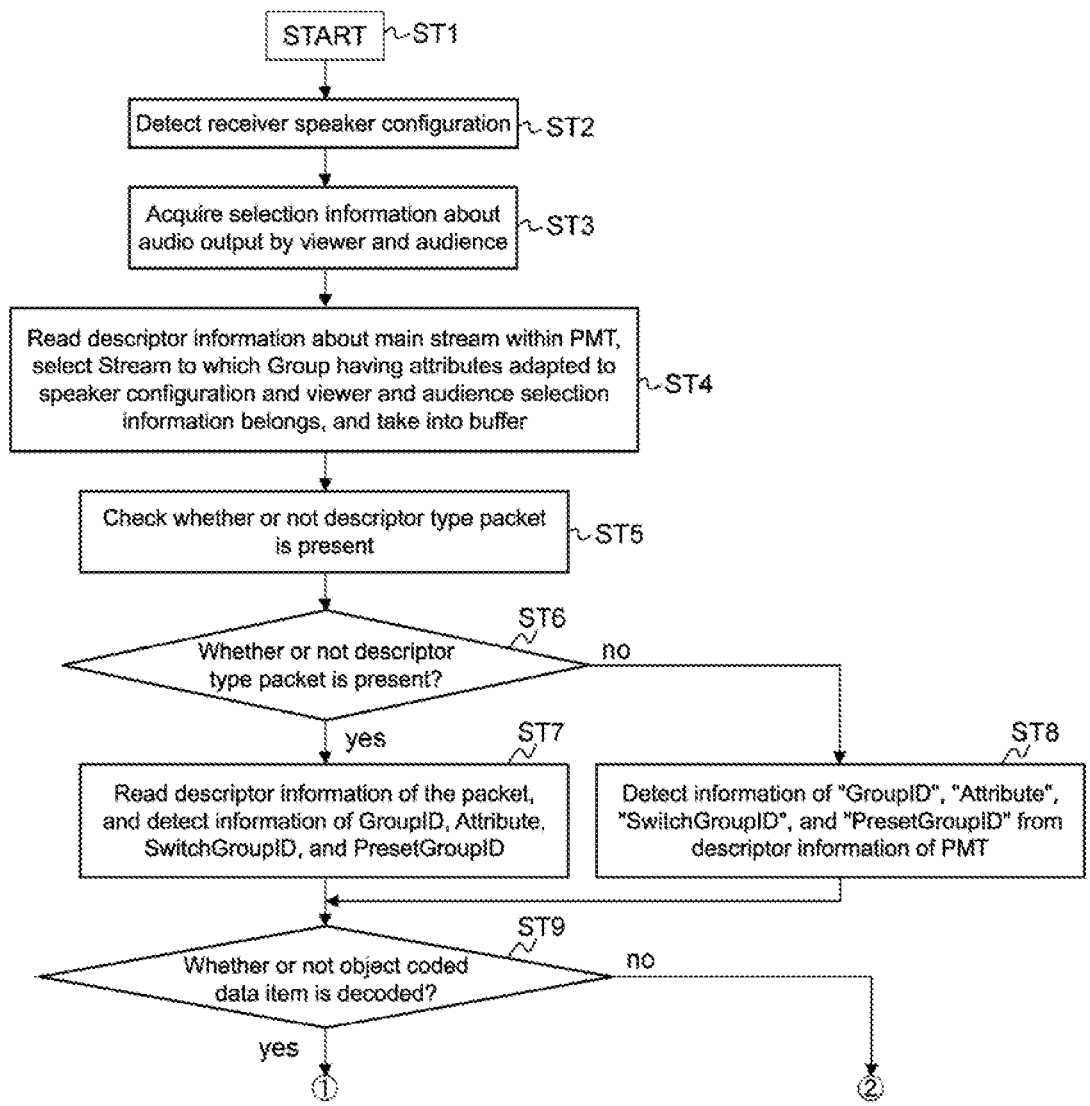
FIG. 22 is a flowchart (1/2) showing an example of audio decode control processing of a CPU in the service receiver.
Figure 23:
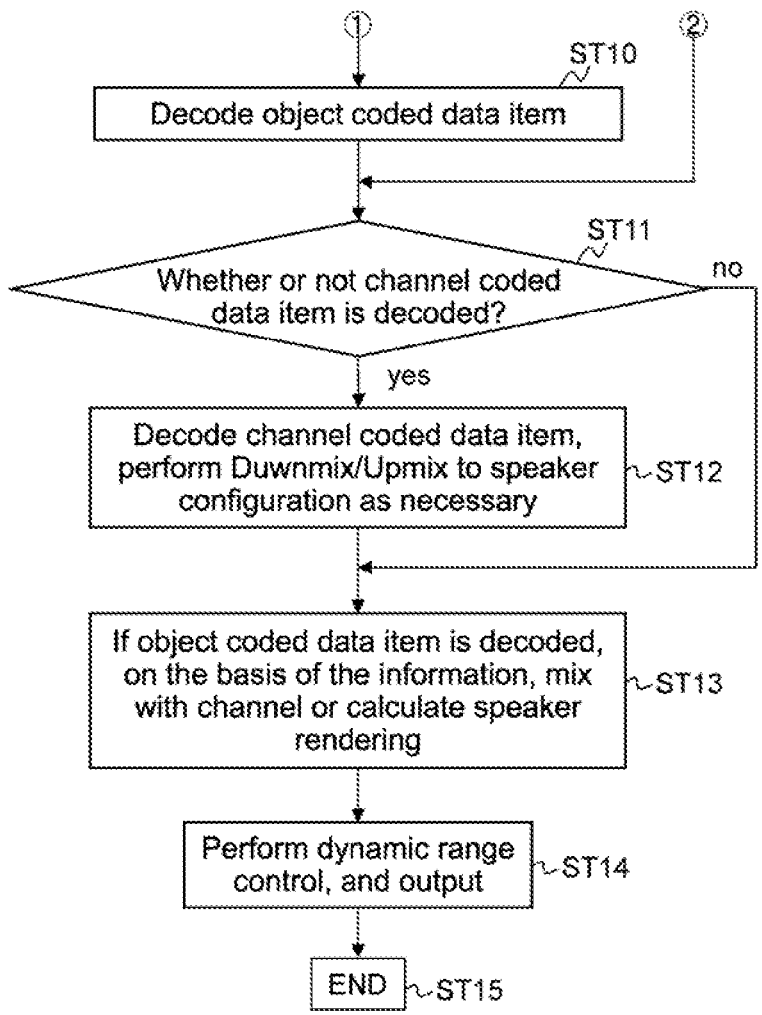
FIG. 23 is a flowchart (2/2) showing the example of audio decode control processing of the CPU in the service receiver.

Flowcharts in FIG. 22 and FIG. 23 show examples of audio decode control processing of the CPU 221 in the service receiver 200 shown in FIG. 15. The CPU 221 starts processing in Step ST1. Then, the CPU 221 detects the receiver speaker configuration, i.e., the speaker configuration of the speaker system 215 in Step ST2. Next, the CPU 221 acquires selection information about an audio output by viewer and audience (user) in Step ST3.

Next, the CPU 221 reads descriptor information about the main stream within the PMT, selects the audio stream to which the group having the attributes adapted for the speaker configuration and viewer and audience selection information belongs, and takes it into a buffer in Step ST4. Then, the CPU 221 checks whether or not a descriptor type packet is present in the audio stream in Step ST5.

Next, the CPU 221 determines whether or not the descriptor type packet is present in Step ST5. If present, the CPU 221 reads the descriptor information of a concerned packet, detects the information of "groupID", "attribute", "switchGroupID", and "presetGroupID" in Step ST7, and then proceeds to processing in Step ST9. On the other hand, if not present, the CPU 221 detects the information of "groupID", "attribute", "switchGroupID", and "presetGroupID" from the descriptor information of the PMT in Step ST8, and then proceeds to processing in Step ST9. Note that it is possible not to execute Step ST8, and to decode a whole audio stream to be subjected.

In Step ST9, the CPU 221 determines whether or not the object coded data item is decoded. If it is decoded, the CPU 221 decodes the object coded data items in Step ST10, and then proceeds to processing in Step ST11. On the other hand, if it is not decoded, the CPU 221 immediately proceeds to processing in Step ST11.

In Step ST11, the CPU 221 determines whether or not the channel coded data item is decoded. If it is decoded, the CPU 221 decodes the channel coded data item, performs downmix or upmix processing on the speaker configuration of the speaker system 215, and acquires the audio data item for driving each speaker, as necessary in Step ST12. Thereafter, the CPU 221 proceeds to processing in Step ST13. On the other hand, if it is not decoded, the CPU 221 proceeds immediately to processing in Step ST13.

In Step ST13, in a case where the CPU 221 decodes the object coded data item, on the basis of the information, it mixes with the channel data item or the speaker rendering is calculated. In the speaker rendering calculation, the speaker rendering (mixing ratio to each speaker) is calculated by azimuth (azimuth information) and elevation (elevation angle information). Depending on the calculation result, the object audio data item is mixed with the channel data for driving each speaker.

Next, the CPU 221 performs a dynamic range control of the audio data item for driving each speaker, and outputs it in Step ST14. Thereafter, the CPU 221 ends the processing in Step ST15.

As described above, in the transmission/reception system 10 shown in FIG. 1, the service transmitter 100 inserts the attribute information indicating the respective attributes of the coded data items of the plurality of groups included in the predetermined number of the audio streams into the layer of the container and/or the layer of the audio stream. Accordingly, the respective attributes of the coded data items of the plurality of groups can be easily recognized before decoding the coded data items at the reception side, and only the coded data items of the necessary group can be selectively decoded and used, whereby a processing load can be reduced.

In the transmission/reception system 10 shown in FIG. 1, the service transmitter 100 inserts the stream correspondence relation information indicating which audio stream includes each of the coded data items of the plurality of groups into the layer of the container and/or the layer of the audio stream. Accordingly, the audio streams including the coded data items of the necessary group can be easily recognized at the reception side, whereby a processing load can be reduced.

2. Alternative Embodiment

In the above-described embodiments, the service receiver 200 selectively takes out the audio streams including the coded data items of the group having the attributes adapted for the speaker configuration and the viewer and audience selection information among the plurality of audio streams transmitted from the service transmitter 100, performs the decode processing, and acquires the predetermined number of audio data items for driving the speaker.

However, it may be conceived that the service receiver selectively takes out one or more audio streams including the coded data items of the group having the attributes adapted for the speaker configuration and the viewer and audience selection information from the plurality of audio streams transmitted from the service transmitter 100, reconfigures the audio streams including the coded data items of the group having the attributes adapted for the speaker configuration and the viewer and audience selection information, and delivers the reconfigured audio streams to a device (also including a DLNA device) connected to an in-house network.

Figure 24:
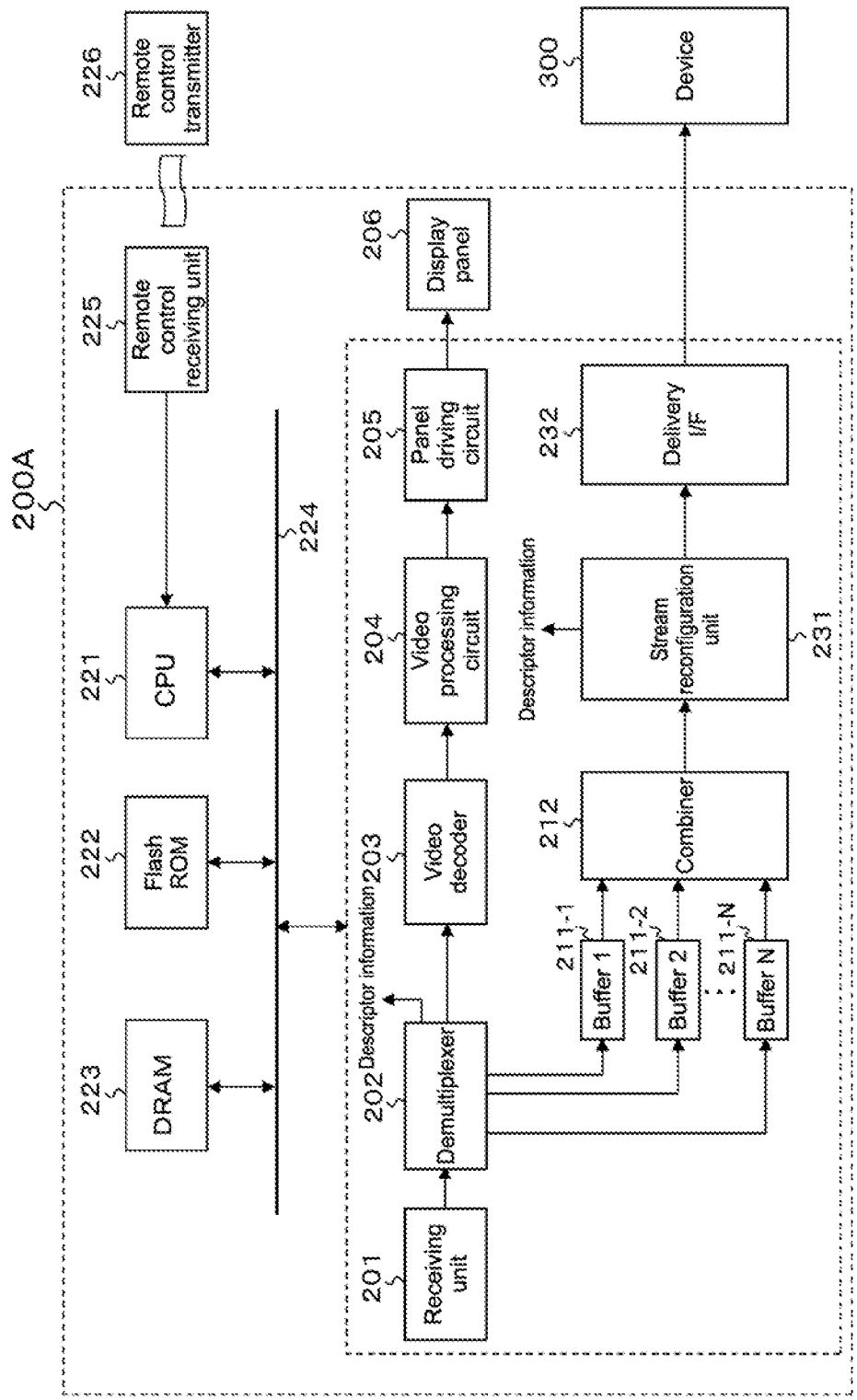
FIG. 24 is a block diagram showing other configuration example of the service receiver.

FIG. 24 shows a configuration example of a service receiver 200A that delivers the reconfigured audio streams to the device connected to the in-house network, as described above. The components in FIG. 24 corresponding to those in FIG. 15 are denoted by the same reference numerals, and thus detailed description thereof will be hereinafter omitted.

The demultiplexer 202 selectively takes out by the PID filter under the control by the CPU 221 the packets or one or more audio streams including the coded data items of the group having the attributes adapted for the speaker configuration and viewer and audience selection information among the predetermined number of audio streams that the transport stream S has.

The audio streams taken out by the demultiplexer 202 are taken in the corresponding multiplexing buffer among the multiplexing buffers 211-1 to 211-N. In the combiner 212, the audio streams are read out every audio frame from each multiplexing buffer in which the audio streams are taken, and are supplied to a stream reconfiguration unit 231.

In the stream reconfiguration unit 231, in a case where the descriptor information ("Desc") is included in the audio streams supplied from the combiner 212, the descriptor information is extracted, and is transmitted to the CPU 221. In the stream reconfiguration unit 231, the coded data items of the group having the attributes adapted for the speaker configuration and viewer and audience (user) selection information are selectively acquired under the control by the CPU 221, and the audio streams having the coded data items are reconfigured. The reconfigured audio streams are supplied to a delivery interface 232. Then, they are delivered (transmitted) from the delivery interface 232 to the device 300 connected to the in-house network.

The in-house network connection includes the Ethernet connection and a wireless connection of "WiFi" or "Bluetooth". The "WiFi" and the "Bluetooth" are registered trademarks.

Also, the device 300 includes a surround speaker, a second display, and an audio output device attached to a network terminal. A device 200 to which the reconfigured audio stream is delivered performs the decode processing similar to the 3D audio decoder 213 in the service receiver 200 in FIG. 15, and acquires the audio data items for driving the predetermined number of speakers.

In addition, as the service receiver, it may be conceived that the above-described reconfigured audio streams are transmitted to a device connected in a digital interface such as "HDMI (High-Definition Multimedia Interface)", "MHL (Mobile High definition Link)", and "DisplayPort". The "HDMI" and the "MHL" are registered trademarks.

Also, in the above-described embodiments, the stream correspondence relation information inserted into the layer or the like of the container is the information indicating the correspondence relation between the group ID and the sub stream ID. Specifically, the sub stream ID is used for correlating the group with the audio stream. However, it may be conceived that a packet identifier (PID: Packet ID) or a stream type (stream_type) is used in order to correlate the group with the audio stream. In a case where the stream type is used, the stream type of each audio stream should be varied.

Also, the above-described embodiments illustrate examples that the attribute information of the coded data items of each group is transmitted by disposing the field of "attribute_of_groupID" (see FIG. 10). However, the present technology also includes a method that can recognize the type (attribute) of the coded data items if the specific group ID is recognized by defining a specific meaning in a value itself of the group ID (GroupID) between the transmitter and the receiver. In this case, the group ID functions as the identifier of the group, but also as the attribute information of the coded data items of the group, whereby the field of "attribute_of_groupID" becomes unnecessary.

Also, the above-described embodiments illustrate examples that the coded data items of the plurality of groups include both of the channel coded data items and the object coded data items (see FIG. 3). However, the present technology is also applicable similarly to the case that the coded data items of the plurality of groups include only the channel coded data items, or only the object coded data items.

Also, the above-described embodiments illustrate examples that the container is the transport stream (MPEG-2 TS). However, the present technology is also applicable similarly to a system where streams are delivered by a container in a format of MP4 or others. For example, the system includes an MPEG-DASH base stream deliver system, or a transmission/reception system that handles an MMT (MPEG Media Transport) structure transmission stream.

The present technology may also have the following configurations.

(1) A transmission apparatus, including:

a transmission unit that transmits a container in a predetermined format having a predetermined number of audio streams including coded data items of a plurality of groups; and an information insertion unit that inserts attribute information indicating respective attributes of the coded data items of the plurality of groups into a layer of the container and/or a layer of an audio stream.

(2) The transmission apparatus according to (1) above, in which the information insertion unit further inserts stream correspondence relation information indicating which audio stream includes each of the coded data items of the plurality of groups into the layer of the container and/or the layer of the audio stream.

(3) The transmission apparatus according to (2) above, in which the stream correspondence relation information is information indicating a correspondence relation between a group identifier for identifying each of the coded data items of the plurality of groups and a stream identifier for identifying each of the predetermined number of audio streams.

(4) The transmission apparatus according to (3) above, in which the information insertion unit further inserts stream identifier information indicating the stream identifier of each of the predetermined number of audio streams into the layer of the container and/or the layer of the audio stream.

(5) The transmission apparatus according to (4) above, in which
the container is MPEG2-TS, and
the information insertion unit inserts the stream identifier information into an audio elementary stream loop corresponding to each of the predetermined number of audio streams present under a program map table in a case where the stream identifier information is inserted into the container.

(6) The transmission apparatus according to (4) or (5) above, in which
the information insertion unit inserts the stream identifier information into a PES payload of a PES packet of each of the predetermined number of audio streams in a case where the stream identifier information is inserted into the audio stream.

(7) The transmission apparatus according to (2) above, in which
the stream correspondence relation information is information indicating a correspondence relation between a group identifier for identifying each of the coded data items of the plurality of groups and a packet identifier added in a case where each of the predetermined number of audio streams is packetized.

(8) The transmission apparatus according to (2) above, in which
the stream correspondence relation information is information indicating a correspondence relation between a group identifier for identifying each of the coded data items of the plurality of groups and type information indicating a stream type of each of the predetermined number of audio streams.

(9) The transmission apparatus according to any of (2) to (3) above, in which
the container is MPEG2-TS, and
the information insertion unit inserts the attribute information and the stream correspondence relation information into the audio elementary stream loop corresponding to at least one or more of audio streams among the predetermined number of audio streams present under the program map table in a case where the attribute information and the stream correspondence relation information are inserted into the container.

(10) The transmission apparatus according to any of (2) to (8) above, in which
the information insertion unit inserts the attribute information and the stream correspondence relation information into a PES payload of a PES packet of at least one or more of the audio streams among the predetermined number of audio streams in a case where the attribute information and the stream correspondence relation information are inserted into the audio stream.

(11) The transmission apparatus according to (1) to (10) above, in which
the coded data items of the plurality of groups include either or both of channel coded data items and object coded data items.

(12) A transmission method, including:
a transmission step of transmitting a container in a predetermined format having a predetermined number of audio streams including coded data items of a plurality of groups by a transmission unit; and
an information-inserting step of inserting attribute information indicating respective attributes of the coded data items of the plurality of groups into a layer of the container and/or a layer of an audio stream.

(13) A reception apparatus, including:
a receiving unit that receives a container in a predetermined format having a predetermined number of audio streams including coded data items of a plurality of groups,
attribute information indicating respective attributes of the coded data items of the plurality of groups being inserted into a layer of the container and/or a layer of an audio stream; and
a processing unit that processes the predetermined number of audio streams included in the received container on the basis of the attribute information.

(14) The reception apparatus according to (13) above, in which
stream correspondence relation information indicating which audio stream includes each of the coded data items of the plurality of groups is further inserted into the layer of the container and/or the layer of the audio stream, and
the processing unit processes the predetermined number of audio streams on the basis of the stream correspondence relation information in addition to the attribute information.

(15) The reception apparatus according to (14) above, in which
the processing unit performs selectively decode processing on audio streams including coded data items of a group having the attributes adapted for a speaker configuration and a user selection information on the basis of the attribute information and the stream correspondence relation information.

(16) The reception apparatus according to any of (13) to (15) above, in which
the coded data items of the plurality of groups include either or both of channel coded data items and object coded data items.

(17) A reception method, including:
a reception step of receiving a container in a predetermined format having a predetermined number of audio streams including coded data items of a plurality of groups by a receiving unit,
attribute information indicating respective attributes of the coded data items of the plurality of groups being inserted into a layer of the container and/or a layer of an audio stream; and
a processing step of processing the predetermined number of audio streams included in the received container on the basis of the attribute information.

(18) A reception apparatus, including:
a receiving unit that receives a container in a predetermined format having a predetermined number of audio streams including coded data items of a plurality of groups,
attribute information indicating respective attributes of the coded data items of the plurality of groups being inserted into a layer of the container and/or a layer of an audio stream;
a processing unit that selectively acquires coded data items of a predetermined group from the predetermined number of audio streams included in the received container on the basis of the attribute information, and reconfigures audio streams including the coded data items of the predetermined group; and
a stream transmission unit that transmits the audio streams reconfigured by the processing unit to an external device.

(19) The reception apparatus according to (18) above, in which
stream correspondence relation information indicating which audio stream includes each of the coded data items of the plurality of groups is further inserted into the layer of the container and/or the layer of the audio stream, and the processing unit selectively acquires the coded data items of the predetermined group from the predetermined number of audio streams on the basis of the stream correspondence relation information in addition to the attribute information.

(20) A reception method, including:

a reception step of receiving a container in a predetermined format having a predetermined number of audio streams including coded data items of a plurality of groups by a receiving unit, attribute information indicating respective attributes of the coded data items of the plurality of groups being inserted into a layer of the container and/or a layer of an audio stream;

a processing step of selectively acquiring coded data items of a predetermined group from the predetermined number of audio streams included in the received container on the basis of the attribute information, and reconfiguring audio streams including the coded data items of the predetermined group; and a stream transmission step of transmitting the audio streams reconfigured in the processing step to an external device.

A main feature of the present technology is that the stream correspondence relation information is inserted into the layer of the container and/or the layer of the audio stream, the stream correspondence relation information indicating which audio stream includes each of the attribute information indicating the respective attributes of the coded data items of the plurality of groups included in the predetermined number of audio streams and the coded data items of the plurality of groups, whereby the processing load at the reception side can be reduced (see FIG. 14).

REFERENCE SIGNS LIST 10 transmission/reception system
100 service transmitter
110 stream generation unit
112 video encoder
113 audio encoder
114 multiplexer
200, 200A service receiver
201 receiving unit
202 demultiplexer
203 video decoder
204 video processing circuit
205 panel driving circuit
206 display panel
211-1 to 211-N multiplexing buffer
212 combiner
213 3D audio decoder
214 sound output processing circuit.
215 speaker system
221 CPU
222 flash ROM
223 DRAM
224 internal bus
225 remote control receiving unit
226 remote control transmitter
231 stream reconfiguration unit
232 delivery interface
300 device

The invention claimed is:

1. A transmission apparatus, comprising:
circuitry configured to
transmit a container in a predetermined format having a predetermined number of audio streams including coded data items of a plurality of groups,
insert attribute information indicating respective attributes of the coded data items of the plurality of groups into a layer of the container or a layer of an audio stream, and
insert stream correspondence relation information indicating which audio stream includes each of the coded data items of the plurality of groups into the layer of the container or the layer of the audio stream, wherein
the stream correspondence relation information indicates a correspondence relation between a group identifier for identifying each of the coded data items of the plurality of groups and a stream identifier for identifying each of the predetermined number of audio streams,
wherein at least one of the predetermined number of audio streams have coded data items in more than one of the plurality of groups.

2. The transmission apparatus according to claim 1, wherein the circuitry is further configured to
insert stream identifier information indicating the stream identifier of each of the predetermined number of audio streams into the layer of the container or the layer of the audio stream.

3. The transmission apparatus according to claim 2, wherein
the container is MPEG2-TS, and
the circuitry is further configured to insert the stream identifier information into an audio elementary stream loop corresponding to each of the predetermined number of audio streams present under a program map table in a case where the stream identifier information is inserted into the container.

4. The transmission apparatus according to claim 2, wherein
the circuitry is further configured to insert the stream identifier information into a PES payload of a PES packet of each of the predetermined number of audio streams in a case where the stream identifier information is inserted into the audio stream.

5. The transmission apparatus according to claim 1, wherein
the stream correspondence relation information indicates a packet identifier added in a case where each of the predetermined number of audio streams is packetized.

6. The transmission apparatus according to claim 1, wherein
the stream correspondence relation information indicates type information indicating a stream type of each of the predetermined number of audio streams.

7. The transmission apparatus according to claim 1, wherein
the container is MPEG2-TS, and
the circuitry is further configured to insert the attribute information and the stream correspondence relation information into an audio elementary stream loop corresponding to at least one or more of audio streams among the predetermined number of audio streams present under a program map table in a case where the attribute information and the stream correspondence relation information are inserted into the container.

8. The transmission apparatus according to claim 1, wherein
the circuitry is configured to insert the attribute information and the stream correspondence relation information into a PES payload of a PES packet of at least one or more of the audio streams among the predetermined number of audio streams in a case where the attribute information and the stream correspondence relation information are inserted into the audio stream.

9. The transmission apparatus according to claim 1, wherein
the coded data items of the plurality of groups include either or both of channel coded data items and object coded data items.

10. A transmission method, comprising:
transmitting a container in a predetermined format having a predetermined number of audio streams including coded data items of a plurality of groups;
inserting attribute information indicating respective attributes of the coded data items of the plurality of groups into a layer of the container or a layer of an audio stream; and
inserting stream correspondence relation information indicating which audio stream includes each of the coded data items of the plurality of groups into the layer of the container or the layer of the audio stream, wherein
the stream correspondence relation information indicates a correspondence relation between a group identifier for identifying each of the coded data items of the plurality of groups and a stream identifier for identifying each of the predetermined number of audio streams,
wherein at least one of the predetermined number of audio streams have coded data items in more than one of the plurality of groups.

11. A reception apparatus, comprising:
circuitry configured to
receive a container in a predetermined format having a predetermined number of audio streams including coded data items of a plurality of groups, the container including attribute information indicating respective attributes of the coded data items of the plurality of groups, the attribute information being inserted into a layer of the container or a layer of an audio stream, and
stream correspondence relation information indicating which audio stream includes each of the coded data items of the plurality of groups into the layer of the container or the layer of the audio stream; and
process the predetermined number of audio streams included in the received container based on the attribute information and the stream correspondence relation information, wherein
the stream correspondence relation information indicates a correspondence relation between a group identifier for identifying each of the coded data items of the plurality of groups and a stream identifier for identifying each of the predetermined number of audio streams,
wherein at least one of the predetermined number of audio streams have coded data items in more than one of the plurality of groups.

12. The reception apparatus according to claim 11, wherein the circuitry is further configured to
perform selectively decode processing on the audio streams including the coded data items of a group of the plurality of groups having the attributes adapted for a speaker configuration and a user selection information based on the attribute information and the stream correspondence relation information.

13. The reception apparatus according to claim 11, wherein
the coded data items of the plurality of groups include either or both of channel coded data items and object coded data items.

14. A reception method, comprising:
receiving a container in a predetermined format having a predetermined number of audio streams including coded data items of a plurality of groups, the container including attribute information indicating respective attributes of the coded data items of the plurality of groups being inserted into a layer of the container or a layer of an audio stream, and
stream correspondence relation information indicating which audio stream includes each of the coded data items of the plurality of groups into the layer of the container or the layer of the audio stream; and
processing the predetermined number of audio streams included in the received container based on the attribute information and the stream correspondence relationship, wherein
the stream correspondence relation information indicates a correspondence relation between a group identifier for identifying each of the coded data items of the plurality of groups and a stream identifier for identifying each of the predetermined number of audio streams,
wherein at least one of the predetermined number of audio streams have coded data items in more than one of the plurality of groups.

15. The reception apparatus according to claim 11, wherein, the circuitry is further configured to
acquire the coded data items of a predetermined group of the plurality of groups from the predetermined number of audio streams included in the received container based on the attribute information, and reconfigure audio streams including the coded data items of the predetermined group; and
transmit the reconfigured audio streams to an external device.

16. The reception apparatus according to claim 15, wherein
the circuitry is further configured to acquire the coded data items of the predetermined group from the predetermined number of audio streams based on the stream correspondence relation information in addition to the attribute information.

17. The reception method according to claim 14, wherein the processing further comprises:
selectively acquiring the coded data items of a predetermined group of the plurality of groups from the predetermined number of audio streams included in the received container based on the attribute information; and
reconfiguring audio streams including the coded data items of the predetermined group; and
transmitting the reconfigured audio streams to an external device.

* * * * *